(12) United States Patent
Tomoda et al.

(10) Patent No.: US 11,594,250 B2
(45) Date of Patent: Feb. 28, 2023

(54) MAGNETIC DISK DEVICE AND REWRITE PROCESSING METHOD

(71) Applicants: Kabushiki Kaisha Toshiba, Tokyo (JP); Toshiba Electronic Devices & Storage Corporation, Tokyo (JP)

(72) Inventors: Yusuke Tomoda, Kanagawa (JP); Akihiko Takeo, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/197,221

(22) Filed: Mar. 10, 2021

(65) Prior Publication Data

US 2022/0068302 A1 Mar. 3, 2022

(30) Foreign Application Priority Data

Aug. 25, 2020 (JP) .............................. JP2020-141690

(51) Int. Cl.
*G11B 5/55* (2006.01)
*G11B 5/012* (2006.01)
*G11B 5/02* (2006.01)
*G11B 20/10* (2006.01)

(52) U.S. Cl.
CPC ............ *G11B 5/5534* (2013.01); *G11B 5/012* (2013.01); *G11B 5/02* (2013.01); *G11B 2020/10851* (2013.01); *G11B 2020/10898* (2013.01)

(58) Field of Classification Search
CPC ......... G11B 5/012; G11B 5/02; G11B 5/5534; G11B 5/5539; G11B 5/596; G11B 5/54; G11B 20/10388; G11B 2020/10851; G11B 2020/10898; G11B 5/59661; G11B 5/59666; G11B 5/59672; G11B 5/59638; G11B 5/55; G11B 2020/1238; G11B 2020/1239; G06F 12/0223; G06F 2212/21
See application file for complete search history.

(56) References Cited

U.S. PATENT DOCUMENTS

| | | | |
|---|---|---|---|
| 8,559,121 B2 | 10/2013 | Saito et al. | |
| 9,087,551 B2 | 7/2015 | Kojima | |
| 9,099,134 B1* | 8/2015 | Pattanasinth | ...... G11B 5/59627 |
| 9,099,155 B1 | 8/2015 | Kataria et al. | |
| 10,192,570 B2* | 1/2019 | Kawabe | ................... G11B 5/09 |
| 10,629,235 B2* | 4/2020 | Kawabe | ............ G11B 5/59633 |
| 10,847,183 B2* | 11/2020 | Tomoda | ................. G11B 5/012 |
| 10,867,632 B2* | 12/2020 | Yamamoto | ............. G11B 5/012 |
| 10,957,343 B1* | 3/2021 | Tomoda | ................... G11B 5/09 |
| 11,189,305 B2* | 11/2021 | Tomoda | ................. G11B 5/312 |
| 2016/0155471 A1* | 6/2016 | Pantel | ................... G11B 20/20 360/47 |
| 2021/0398559 A1* | 12/2021 | Kawabe | ........... G11B 20/10388 |

* cited by examiner

*Primary Examiner* — Dionne Pendleton
(74) *Attorney, Agent, or Firm* — Allen & Overy LLP

(57) ABSTRACT

According to one embodiment, a magnetic disk device includes a disk having a first region in which a plurality of tracks is written and a second region that is positioned with a gap in a first direction of the radial direction of the first region, and in which a plurality of tracks is overwritten in the first direction, a head, and a controller that offsets part of a plurality of tracks which is overwritten in the second region in a second direction opposite the first direction to perform rewriting.

18 Claims, 18 Drawing Sheets

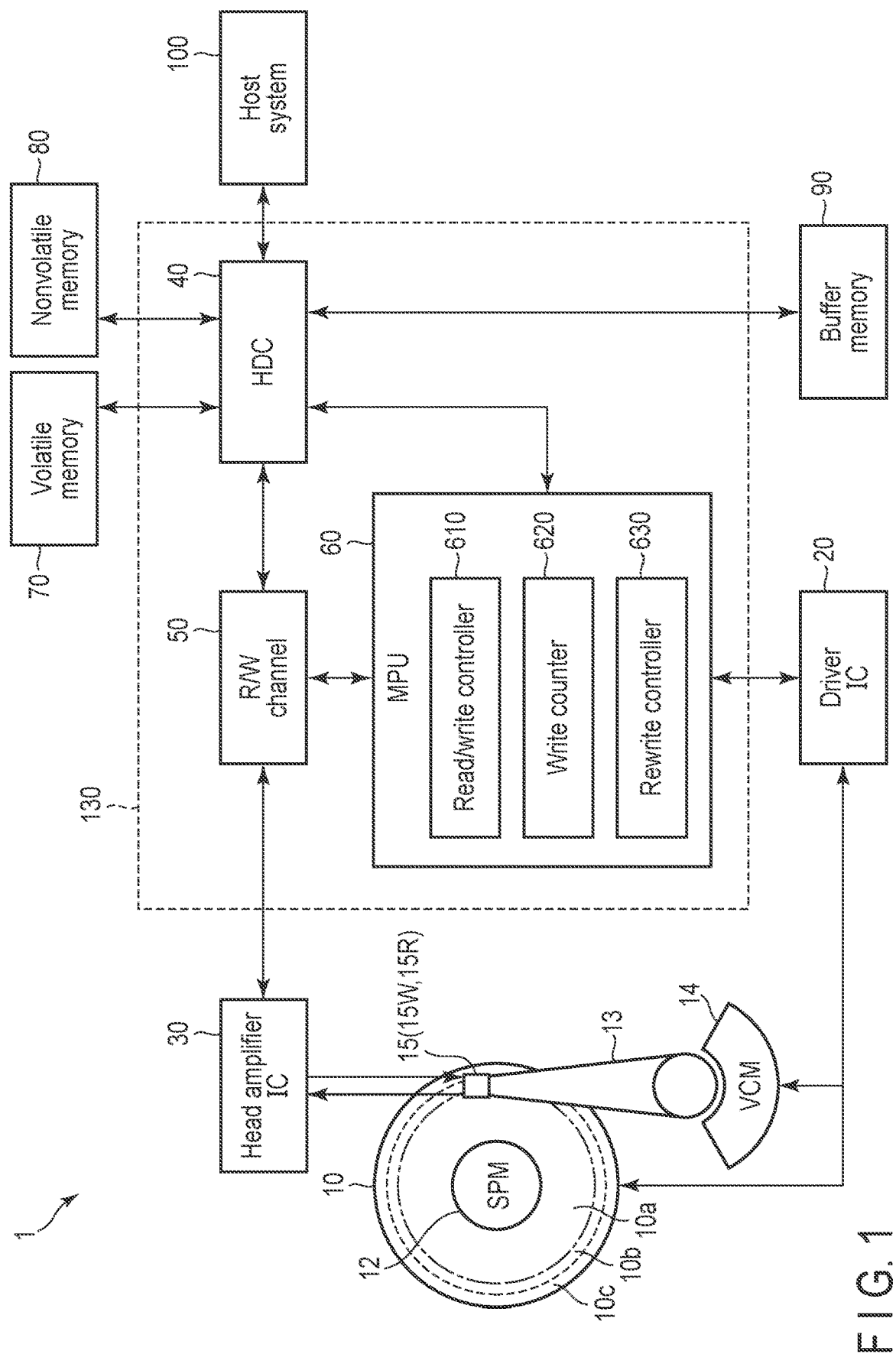
F I G. 1

| Band region | Number of times of writing |
|---|---|
| ⋮ | ⋮ |
| SBA1 | WCO1 |
| | WCI1 |
| SBA2 | WCO2 |
| | WCI2 |
| ⋮ | ⋮ |

TB1

F I G. 5

| Band region | Track | The number of times of writing (number) |
|---|---|---|
| ⋮ | ⋮ | ⋮ |
| CBA1 | CTR11 | CTO11 |
| | | CTI11 |
| | ⋮ | ⋮ |
| | CTR1(n-1) | CTO1(n-1) |
| | | CTI1(n-1) |
| | CTR1n | CTO1n |
| | | CTI1n |
| SBA2 | | STO |
| | | STI |
| ⋮ | ⋮ | ⋮ |

MAGNETIC DISK DEVICE AND REWRITE PROCESSING METHOD

CROSS-REFERENCE TO RELATED APPLICATIONS

This application is based upon and claims the benefit of priority from Japanese Patent Application No. 2020-141690, filed Aug. 25, 2020, the entire contents of which are incorporated herein by reference.

FIELD

Embodiments described herein relate generally to a magnetic disk device and a rewrite processing method.

BACKGROUND

In recent years, magnetic disk devices having a technique that achieves high recording density have been developed. An example of a magnetic disk device that achieves high recording density includes a magnetic disk device that can execute a shingled write magnetic recording (SMR) or a shingled write recording (SWR) in which a plurality of tracks is overwritten in the radial direction of the disk. In addition, an example of another magnetic disk device that achieves high recording density includes a magnetic disk device that can be executed by selecting a conventional magnetic recording type in which a plurality of tracks is written with an interval in the radial direction of the disk or a shingled write magnetic recording type.

These magnetic disk devices shingled-write-magnetic-records data in a region including a particular number of tracks or a region in which data of a particular data capacity can be recorded by the shingled write magnetic recording (hereinafter, may be referred to as a band region). These magnetic disk devices are required to perform a process (hereinafter, may be referred to as a refresh process or a rewrite process) of renewing the data written to a particular band region to the same region, a process (hereinafter, may be referred to as an overwrite process) of overwriting data to part of a particular band region, and the like in band region unit. For this reason, in the magnetic disk device, refreshing or overwriting the data written to a particular region with a shingled write magnetic recording type takes more time than refreshing or overwriting the data written to a particular region with a conventional magnetic recording type in which a plurality of tracks that is lined up in the radial direction of the disk is written with a particular interval. Therefore, a magnetic disk device capable of performing the shingled write magnetic recording type may have lower write/read responsiveness than a magnetic disk device that writes data simply by the conventional magnetic recording type.

BRIEF DESCRIPTION OF THE DRAWINGS

FIG. 1 is a block diagram showing the configuration of a magnetic disk device according to a first embodiment.
FIG. 5 is a schematic diagram showing an example of a table of the number of times of writing.
FIG. 15 is a schematic diagram showing an example of a table of the number of times of writing.

DETAILED DESCRIPTION

Figure 2:
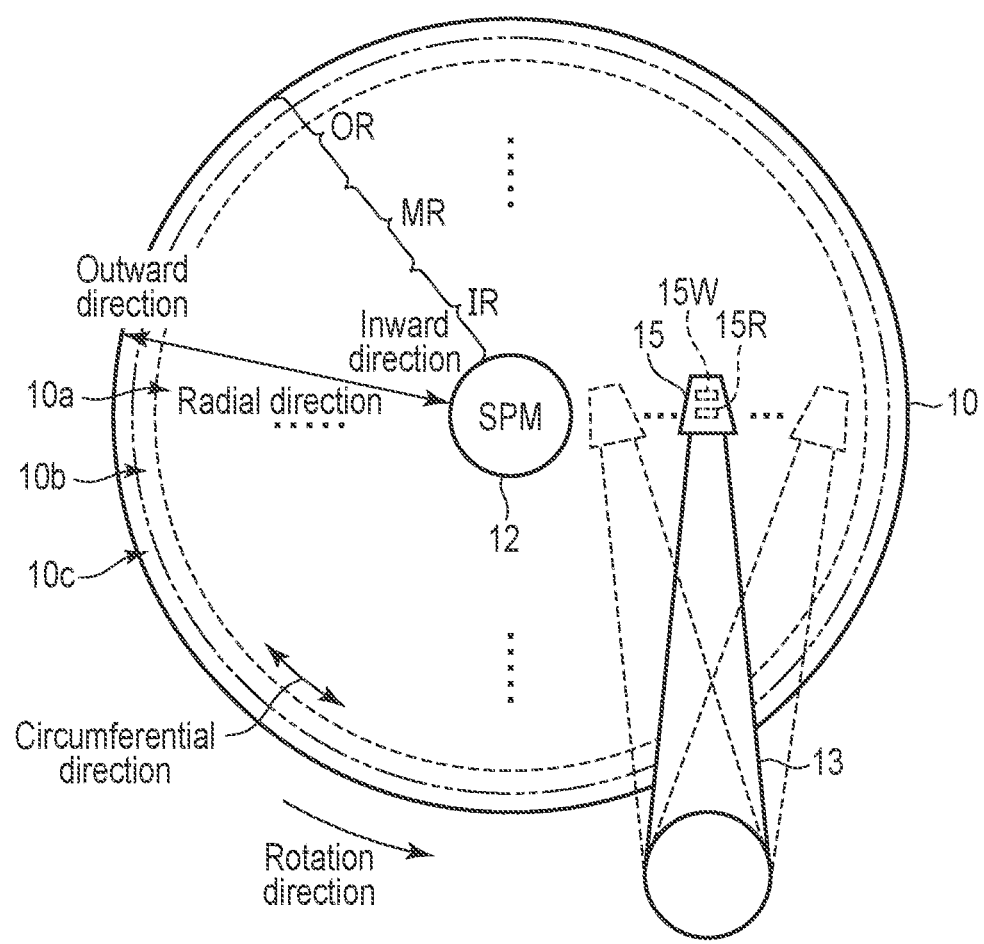
FIG. 2 is a schematic view showing an example of a disk according to the first embodiment.

In general, according to one embodiment, a magnetic disk device comprises: a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction; a head that writes data to the disk and that reads data from the disk; and a controller that offsets part of a plurality of tracks which is overwritten in the second region in a second direction opposite the first direction to perform rewriting.

Hereinafter, embodiments will be described with reference to the drawings. It should be noted that the drawings are merely examples and do not limit the scope of the invention.

First Embodiment

FIG. 1 is a block diagram showing the configuration of a magnetic disk device 1 according to the first embodiment.

The magnetic disk device 1 includes a head disk assembly (HDA), a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is an integrated circuit of one chip. Further, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the drive of the SPM 12. The arm 13 and the VCM 14 constitute an actuator. The actuator controls the movement of the head 15 mounted on the arm 13 to a particular position on the disk 10 by driving the VCM 14. Two or more disks 10 and two or more heads 15 may be provided.

In the disk 10, a user data region 10*a* that can be used by the user, a media cache (or sometimes referred to as a media cache area) 10*b* that temporarily holds data (or commands) transferred from a host or the like before performing writing to a particular region of the user data region 10*a*, and a system area 10*c* in which the information required for system management is written are allocated in a region where the data can be written. Hereinafter, the direction from the inner circumference toward the outer circumference of the disk 10 or the direction from the outer circumference toward the inner circumference of the disk 10 is referred to as a radial direction. In the radial direction, the direction from the inner circumference toward the outer circumference is referred to as an outward direction (outside), and the direction from the outer circumference to the inner circumference is referred to as an inward direction (inside). A direction that intersects, for example, is orthogonal to the radial direction of the disk 10 is referred to as a circumferential direction. That is, the circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The disk 10 is divided into a plurality of regions (hereinafter, may be referred to as zones) for each particular range in the radial direction. The zone may include a plurality of regions (hereinafter, may be referred to as band regions) for each particular range in the radial direction. The band region includes a plurality of tracks. For example, the band region corresponds to a region in which a particular number of tracks can be written, or a region in which data having a particular data capacity can be written. The track includes a plurality of sectors. Hereinafter, a zone, a band region, a track, or the like may be referred to as a radial region. The "track" has various meanings such as one region of a plurality of radially divided regions of the disk 10, a path of the head 15 at a particular radial position, data extending in the circumferential direction of the disk 10, data for one lap of data written to a track at a particular radial position, data written to a particular track of the disk 10, part of data written to a particular track of the disk 10, and the like. The term "sector" has various meanings such as one region of a plurality of regions obtained by dividing a particular track of the disk 10 in the circumferential direction, data written to a circumferential position at the particular radial position of the disk 10, data written to a particular sector of a particular track of the disk 10, and the like. The "track written to the disk 10" may be referred to as a "write track", and the "track read from the disk 10" may be referred to as a "read track". The "write track" may be simply referred to as a "track", the "read track" may be referred to simply as a "track", and the "write track" and the "read track" may be collectively referred to as a "track". The "radial width of the track" may be referred to as a "track width". The "radial width of the write track" may be referred to as a "write track width", and the "radial width of the read track" may be referred to as a "read track width". The "write track width" may be simply referred to as a "track width", the "read track width" maybe simply referred to as "track width", and the "write track width and the read track width" may be collectively referred to as a "track width". The "path passing through the center position of the track width in a particular track" is referred to as a "track center". The "path passing through the center position of the write track width in a particular write track" may be referred to as a "write track center", and the "path passing through the center position of the read track width of the read track" may be referred to as a "read track center". The "write track center" may be simply referred to as a "track center", the "read track center" may be simply referred to as a "track center", and the "write track center and read track center" may be collectively referred to as a "track center".

The head 15 has a slider as a main body, and has a write head 15W and a read head 15R mounted on the slider. The write head 15W writes data to the disk 10. The read head 15R reads the data written to the disk 10. In addition, the "write head 15W" may be simply referred to as the "head 15", the "read head 15R" may be simply referred to as the "head 15", and the "write head 15W and read head 15R" may be collectively referred to as the "head 15". The "center of the head 15" may be referred to as the "head 15", the "center of the write head 15W" may be referred to as the "write head 15W", and the "center of the read head 15R" may be referred to as the "read head 15R". The "center of the write head 15W" may be simply referred to as the "head 15", and the "center of the read head 15R" may be simply referred to as the "head 15". "Positioning the center of the head 15 to the track center of a particular track" may be expressed as "positioning the head 15 to a particular track", "disposing the head 15 on a particular track", "locating the head 15 on a particular track" or the like.

FIG. 2 is a schematic view showing an example of the disk 10 according to the present embodiment. As shown in FIG. 2, the direction in which the disk 10 rotates in the circumferential direction is referred to as a rotation direction. In the example shown in FIG. 2, the rotation direction is shown counterclockwise, but it may be in the opposite direction (clockwise). In FIG. 2, the disk 10 is divided into an inner circumference region IR located inward, an outer circumference region OR located outward, and a middle circumference region MR located between the inner circumference region IR and the outer circumference region OR.

In the example shown in FIG. 2, the disk 10 includes the user data region 10*a*, the media cache 10*b*, and the system area 10*c*. In FIG. 2, the user data region 10*a*, the media cache 10*b*, and the system area 10*c* are disposed in the order described in the outward direction. In FIG. 2, the media cache 10*b* is disposed adjacent to the user data region 10*a* in the outward direction. In other words, the media cache 10*b* is located between the user data region 10*a* and the system area 10*c*. Here, "adjacent" includes not only a state in which data, an object, a region, a space, etc., are disposed in contact with each other, but also a state in which they are disposed at a particular interval. In FIG. 2, the system area 10*c* is disposed adjacent to the media cache 10*b* in the outward direction. The arrangement order of the user data region 10*a*, the media cache 10*b*, and the system area 10*c* is not limited to the order shown in FIG. 2, but may be any order.

In the example shown in FIG. 2, the user data region 10*a* is disposed from the inner circumference region IR to the outer circumference region OR in the radial direction. In other words, the user data region 10*a* is disposed from the innermost circumference of the disk 10 to a particular radial position of the outer circumference region OR in the radial direction. In the example shown in FIG. 2, the media cache 10b is disposed in the outer circumference region OR in the radial direction. The media cache 10b may be located in the inner circumference region IR or the middle circumference region MR. Further, the media cache 10b may be dispersedly located in the outer circumference region OR, the middle circumference region MR, and the inner circumference region IR. In the example shown in FIG. 2, the system area 10c is disposed in the outer circumference region OR in the radial direction. In other words, the system area 10c is disposed from a particular position of the outer circumference region OR to the outermost circumference of the disk 10.

Data can be written in the user data region 10a of disk 10 in a shingled write magnetic recording (SMR), or shingled write recording SWR) type in which the track to be written next is overwritten on part of a particular track in the radial direction. Hereinafter, "writing data by the shingled write magnetic recording type" may be simply referred to as a "shingled write magnetic recording" or a "shingled write magnetic recording process". In addition, the write process other than the "conventional magnetic recording process" may be referred to as a "shingled write magnetic recording process".

A band region including a plurality of tracks overwritten by shingled write magnetic recording may be disposed in the user data region 10a of the disk 10. Hereinafter, the "band region including a plurality of tracks overwritten by shingled write magnetic recording" may be referred to as a "shingled write magnetic recording band region", and the "shingled write magnetic recording band region" may be simply referred to as a "band region".

Data is written to the media cache 10b and the system area 10c of disk 10 in the conventional magnetic recording (CMR) type in which a track (hereinafter, also referred to as an adjacent track) that is radially adjacent to a particular track is written away from this particular track by a particular interval in the radial direction. Hereinafter, "writing data by the conventional magnetic recording type" may be simply referred to as a "conventional magnetic recording" or a "conventional magnetic recording process". Data may be written to the media cache 10b and the system area 10c of the disk 10 by a recording type other than the conventional magnetic recording type, for example, the shingled write magnetic recording type.

As shown in FIG. 2, the head 15 is driven by the VCM 14 with respect to the disk 10 to rotate around the rotation axis, moves from the inward direction to the outward direction to be disposed at a particular position, or moves from the outward direction to the inward direction to be disposed at a particular position.

The driver IC 20 controls the driving of the SPM 12 and the VCM 14 according to the control of the system controller 130 (specifically, the MPU 60 described later).

The head amplifier IC (preamplifier) 30 includes a read amplifier, a write driver, and the like. The read amplifier amplifies the read signal read from the disk 10 to output it to the system controller 130 (specifically, a read/write (R/W) channel 50 to be described later). The write driver outputs a write current corresponding to the signal output from the R/W channel 50 to the head 15.

The volatile memory 70 is a semiconductor memory from which stored data is lost when power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The nonvolatile memory 80 is a semiconductor memory that records data stored even when power supply is cut off. The nonvolatile memory 80 is, for example, a NOR type or NAND type flash read only memory (FROM).

A buffer memory 90 is a semiconductor memory that temporarily records data and the like transmitted and received between the magnetic disk device 1 and a host 100. It is to be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using a large scale integrated circuit (LSI) referred to as a System-on-a-Chip (SoC) in which a plurality of elements is integrated on a single chip, for example. The system controller 130 includes a hard disk controller (HDC) 40, a read/write (R/W) channel 50, and a microprocessor or a microprocessing unit (MPU) 60. The HDC 40, the R/W channel 50, and the MPU 60 are electrically connected to each other. The system controller 130 is electrically connected to, for example, the driver IC 20, the head amplifier IC 30, the volatile memory 70, the nonvolatile memory 80, the buffer memory 90, the host system 100, and the like.

The HDC 40 controls data transfer between the host 100 and the R/W channel 50 in response to an instruction from the MPU 60 described later. The HDC 40 is electrically connected to, for example, the volatile memory 70, the nonvolatile memory 80, the buffer memory 90, and the like.

The R/W channel 50 performs a signal process of read data and write data in response to an instruction from the MPU 60. The R/W channel 50 has a circuit or a function of modulating write data. The R/W channel 50 has a circuit or a function for measuring a signal quality of read data. The R/W channel 50 is electrically connected to, for example, the head amplifier IC 30, and the like.

The MPU 60 is a main controller that controls respective units of the magnetic disk device 1. The MPU 60 controls the VCM 14 via the driver IC 20 and performs the positioning of the head 15. The MPU 60 controls a write operation of the data to the disk 10 and selects the storage destination of the write data transferred from the host 100. In addition, the MPU 60 controls the read operation of the data from the disk 10 and controls the process of the read data transferred from the disk 10 to the host 100. The MPU 60 also manages a region for recording data. The MPU 60 is connected to each part of the magnetic disk device 1. The MPU 60 is electrically connected to, for example, the driver IC 20, the HDC 40, the R/W channel 50, and the like.

The MPU 60 includes a read/write controller 610, a write counter 620, and a rewrite (or refresh) control unit 630. The MPU 60 executes the process of each unit, for example, the read/write controller 610, the write counter 620, the rewrite controller 630, and the like on the firmware. The MPU 60 may include each unit, for example, the read/write controller 610, the write counter 620, the rewrite (or refresh) control unit 630, and the like as a circuit.

The read/write controller 610 controls the data read process and the write process according to a command or the like from the host 100. The read/write controller 610 controls the VCM 14 via the driver IC 20, positions the head 15 at a particular position on the disk 10, and performs the read process or the write process.

The read/write controller 610 writes a track (or data) in a band region, for example, a shingled write magnetic recording band region unit. The read/write controller 610 performs the shingled write magnetic recording process according to a command or the like from the host 100. In other words, the read/write controller 610 shingled-write-magnetic-records data in a particular band region (particular shingled write magnetic recording band region) according to a command or the like from the host 100. Hereinafter, in the shingled write magnetic recording band region, one piece of related data which is shingled-write-magnetic-recorded, for example, the initially shingled-write-magnetic-recorded track at one end of a plurality of shingled-write-magnetic-recorded tracks is referred to as an initial shingled write magnetic recording track, and a track that is shingled-write-magnetic-recorded last at the other end opposite the one end, and which another track does not overlap may be referred to as a last shingled write magnetic recording track. Further, the read/write controller 610 sequentially writes data or tracks in a particular shingled write magnetic recording band region. The read/write controller 610 may perform the conventional magnetic recording process according to a command or the like from the host 100. In other words, the read/write controller 610 conventional-magnetic-records data according to a command or the like from the host 100.

Figure 3:
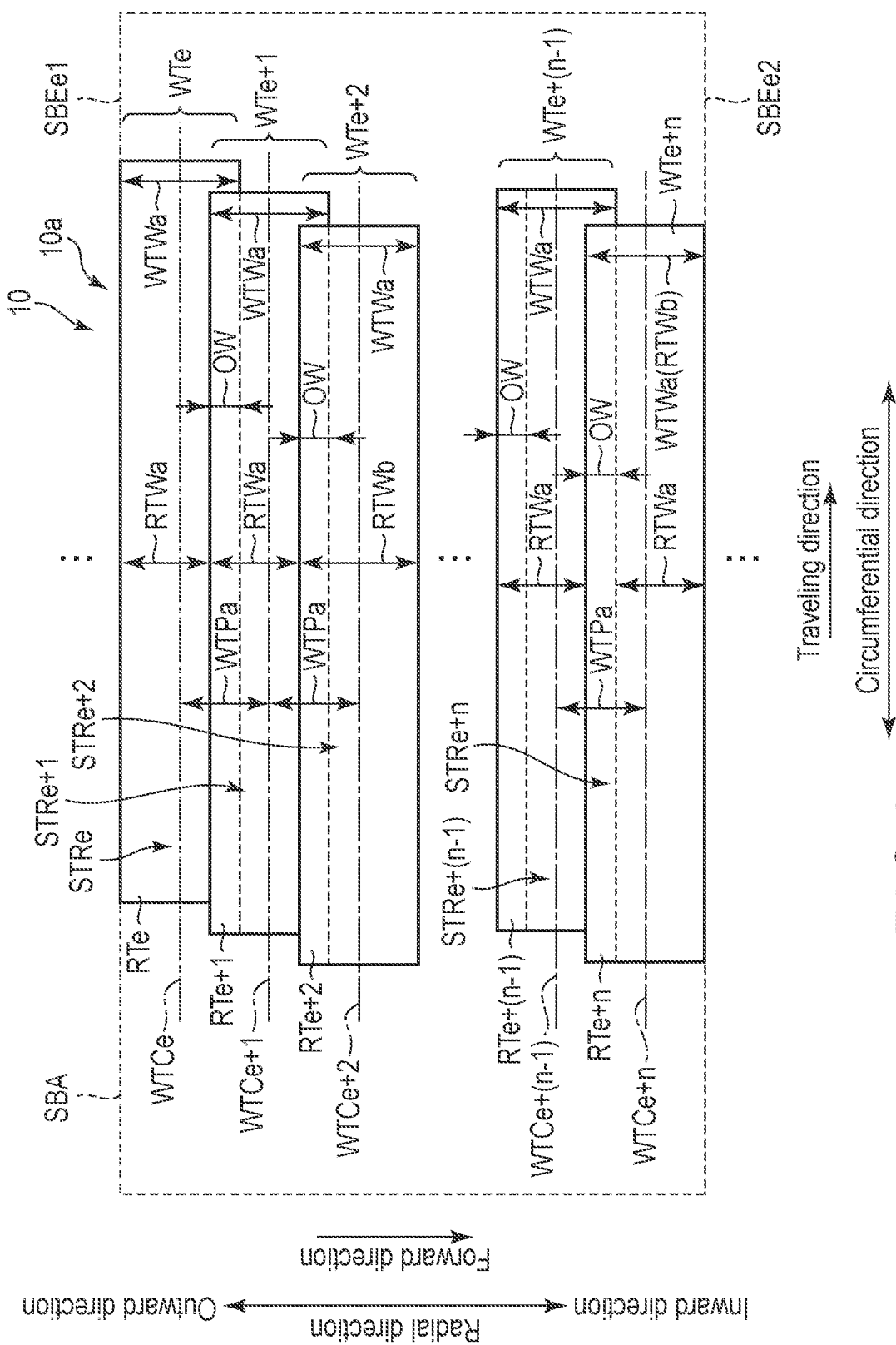
FIG. 3 is a schematic diagram showing an example of a shingled write magnetic recording process.

FIG. 3 is a schematic view showing an example of the shingled write magnetic recording process. FIG. 3 shows a shingled write magnetic recording band region SBA. In the example shown in FIG. 3, the shingled write magnetic recording band region SBA includes tracks STRe, STRe+1, STRe+2, . . . , STRe+(n−1), and STRe+n. In the shingled write magnetic recording band region SBA, the tracks STRe to STRe+n are continuously overwritten in the radial direction. FIG. 3 shows the forward direction. In the radial direction, the direction in which a plurality of tracks is continuously shingled-write-magnetic-recorded or the direction in which a plurality of tracks is continuously recorded in a sequential manner may be referred to as a forward direction. That is, the forward direction corresponds to a direction from the initial shingled write magnetic recording track toward the last shingled write magnetic recording track in the radial direction. In the radial direction, the direction opposite the forward direction may be referred to as a reverse direction. That is, the reverse direction corresponds to a direction from the last shingled write magnetic recording track toward the initial shingled write magnetic recording track in the radial direction. In the radial direction of FIG. 3, the forward direction corresponds to the inward direction. Hereinafter, the forward direction will be described as corresponding to the inward direction. The forward direction may correspond to a direction different from the inward direction, for example, the outward direction. In FIG. 3, the track STRe is located at the extreme end (end or one end) SBEe1 of the shingled write magnetic recording band region SBA in the reverse direction. That is, in FIG. 3, the track STRe corresponds to the initial shingled write magnetic recording track. In FIG. 3, the track STRe+n is located at the extreme end (end or the other end) SBEe2 of the shingled write magnetic recording band region SBA in the forward direction. That is, in FIG. 3, the track STRe+n corresponds to the last shingled write magnetic recording track. The track STRe written to the disk 10 by the write head of 15W may be referred to as a write track WTe, the track STRe+1 written to the disk 10 by the write head 15W may be referred to as a write track WTe+1 the track STRe+2 written to the disk 10 by the write head 15W may be referred to as a write track WTe+2, the track STRe+(n−1) written to the disk 10 by the write head 15W may be referred to as a write track WTe+(n−1), and the track STRe+n written to the disk 10 by the write head 15W may be referred to as a write track WTe+n. The write tracks WTe to WTe+n have the same write track width WTWa. Hereinafter, the write track width of each write track will be described as being the same. The write tracks WTe to WTe+n may have different write track widths. Terms such as "same", "identical", "match", and "equivalent" include the meaning of being exactly the same, as well as the meaning of being different to the extent that they can be considered to be substantially the same. The write track WTe (track STRe) to the write track WTe+n (track STRe+n) are each written with a track pitch WTPa in the radial direction. The write track WTe (track STRe) to the write track WTe+n (track STRe+n) may be written with different track pitches in the radial direction. The track pitch corresponds, for example, to a radial distance between the track centers of two adjacent tracks. In the example shown in FIG. 3, the track center WTCe of the write track WTe and the track center WTCe+1 of the write track WTe+1 are written away by the track pitch WTPa in the radial direction. For example, the track center WTCe+1 of the write track WTe+1 and the track center WTCe+2 of the write track WTe+2 are written away by the track pitch WTPa in the radial direction. Further, for example, the track center WTCe+(n−1) of the write track WTe+(n−1) and the track center WTCe+n of the write track WTe+n are written away by the track pitch WTPa in the radial direction. In addition, in the write track WTe (track STRe) to the write track WTe+n (track STRe+n), data is overwritten to part of the track that was written immediately before a track (hereinafter, may be simply referred to as the previous track) that is written sequentially in the forward direction in the radial direction. In FIG. 3, the write track WTe (track STRe) to the write track WTe+n (track STRe+n), are each overwritten in the radial length or range (hereinafter, radial range or radial region) OW from the end of the previous track in forward direction. Hereinafter, the radius range (or radial region) OW in which a particular track and a track with which this track is overwritten overlap may be referred to as an overlapping range OW. In FIG. 3, the write track WTe (track STRe) to the write track WTe+n (track STRe+n) may be overwritten in an overlapping range different from the overlapping range OW. In FIG. 3, the write track WTe (track STRe) corresponds to the initial shingled write magnetic recording track STRe, and the write track WTe+n (track STRe+n) corresponds to the last shingled write magnetic recording track STRe+n.

In each track, the region where the other tracks do not overlap may be referred to as a read track. In FIG. 3, a region, of the write track WTe, where the write track WTe+1 does not overlap may be referred to as a read track RTe (track STRe), a region, of the write track WTe+1, where the write track WTe+2 does not overlap may be referred to as a read track RTe+1 (track STRe+1), and a region, of the write track WTe+n, where the write track WTe+(n−1) does not overlap may be referred to as a read track RTe+(n−1) (track STRe+(n−1)). In addition, the last shingled write magnetic recording track STRe+n (write track WTe+n) may be referred to as a read track RTe+n. In FIG. 3, the read tracks RTe (track STRe) to RTe+(n−1) (track STRe+(n−1)) have the same read track width RTWa. Hereinafter, the read track width of each read track other than the last shingled write magnetic recording track will be described as the same. The read tracks RTe to RTe+(n−1) may have different read track widths. Further, the read track RTe+n (last shingled write magnetic recording track STRe+n) has a read track width RTWb larger than the read track width RTWa of the other read tracks RTe to RTe+(n−1). The read track width RTWb corresponds to the write track width WTWa. In the example shown in FIG. 3, the difference between the read track width RTWb and the overlapping range OW between the track STRe+(n−1) and the track STRe+n corresponds to the width RTWa in the radial direction. In FIG. 3, for convenience of explanation, each track is shown as a rectangle extending in the circumferential direction with a particular track width, but practically, it is curved along the circumferential direction. Further, each track may have a wavy shape extending in the circumferential direction while fluctuating in the radial direction.

In the example shown in FIG. 3, the read/write controller 610 sequentially shingled-write-magnetic-records the write tracks WTe, WTe+1, WTe+2, . . . , WTe+(n−1), and WTe+n toward the forward direction in the order described in the shingled write magnetic recording band region SBA of the user data region 10a. In other words, the read/write controller 610 overwrites the track STRe (write track WTe), the track STRe+1 (write track WTe+1), the track STRe+2 (write track WTe+2), . . . , the track STRe+(n−1) (write track WTe+(n−1)), and the track STRe+n (write track WTe+n) in the forward direction in the order described in the shingled write magnetic recording band region SBA of the user data region 10a.

In the example shown in FIG. 3, the read/write controller 610 positions the head 15 at the track center WTCe in the shingled write magnetic recording band region SBA of the user data region 10a to write the write track WTe. The read/write controller 610 positions the head 15 at the track center WTCe+1 which is away from the track center WTCe of the write track WTe in the forward direction by the track pitch WTPa in the shingled write magnetic recording band region SBA to shingled-write-magnetic-record the write track WTe+1 on the write track WTe. The read/write controller 610 positions the head 15 at the track center WTCe+2 which is away from the track center WTCe+1 of the write track WTe+1 in the forward direction by the track pitch WTPa in the shingled write magnetic recording band region SBA to shingled-write-magnetic-record the write track WTe+2 on the write track WTe+1. The read/write controller 610 positions the head 15 at the track center WTCe+n which is away from the track center WTCe+(n−1) of the write track WTe+(n−1) in the forward direction by the track pitch WTPa in the shingled write magnetic recording band region SBA to shingled-write-magnetic-record the write track WTe+n on the write track WTe+(n−1).

Figure 4:
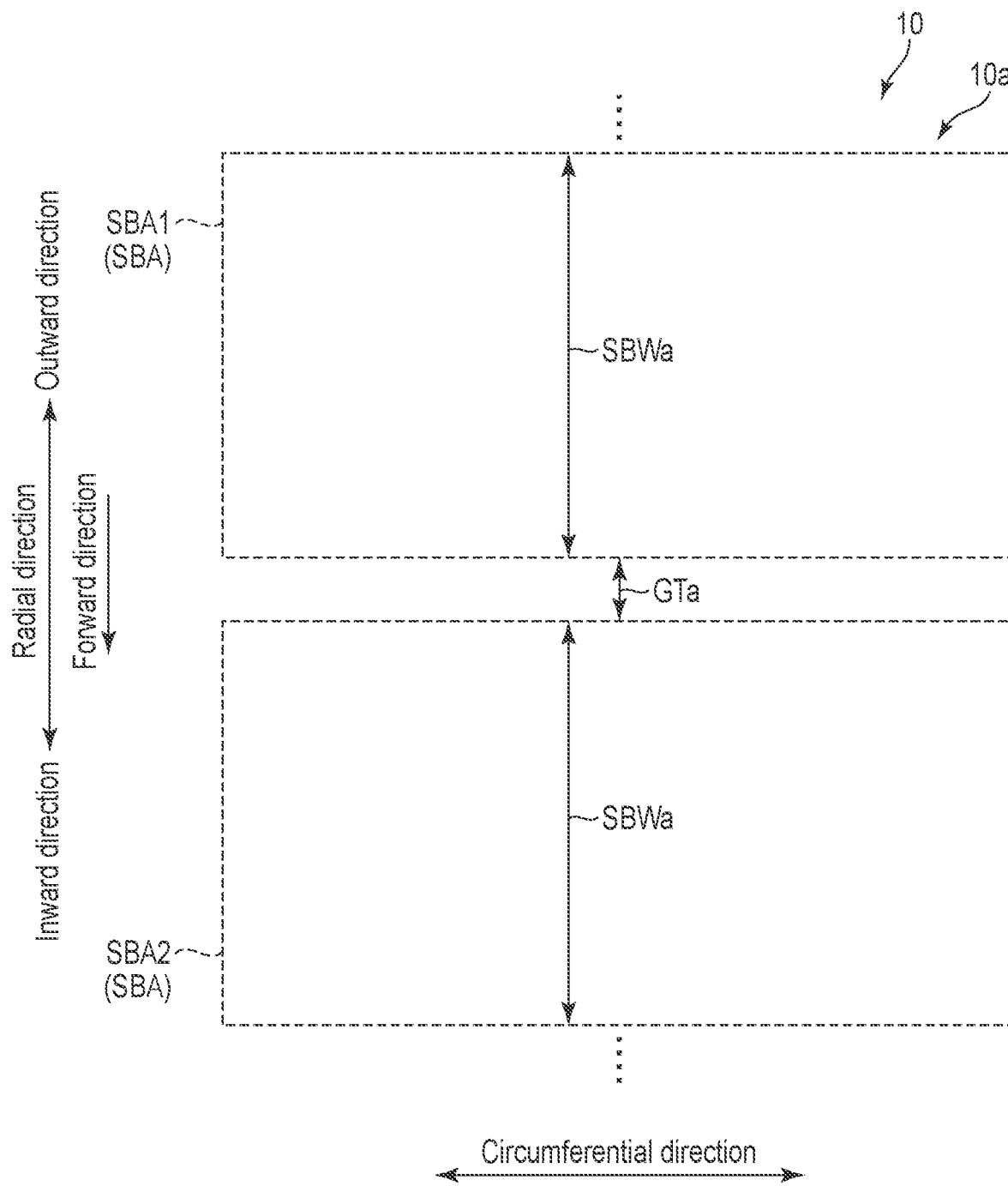
FIG. 4 is a schematic diagram showing an example of the arrangement of a shingled write magnetic recording band region.

FIG. 4 is a schematic diagram showing an example of the arrangement of the shingled write magnetic recording band regions SBA1 and SBA2. FIG. 4 shows two shingled write magnetic recording band regions SBA (SBA1 and SBA2) that are adjacent to each other in the radial direction. In FIG. 4, the shingled write magnetic recording band regions SBA1 and SBA2 have the same radial width SBWa (hereinafter, may be referred to as a shingled write magnetic recording bandwidth). In other words, in FIG. 4, the areas of the shingled write magnetic recording band regions SBA1 and SBA2 are the same. The shingled write magnetic recording band regions SBA1 and SBA2 may have different shingled write magnetic recording bandwidths. In other words, the areas of the shingled write magnetic recording band regions SBA1 and SBA2 may be different. Two band regions that are adjacent to each other in the radial direction are disposed with a particular interval (hereinafter, may be referred to as a guard track or a guard gap) in order to reduce the influence of writing bleeding, leakage magnetic field, etc., that occur when data is written to respective band regions. In FIG. 4, the shingled write magnetic recording band region SBA1 and the shingled write magnetic recording band region SBA2 are disposed with the radial length GTa of the guard track (or may be referred to as a guard gap). Hereinafter, the radial length GTa of the guard track (guard gap or clearance) may be simply referred to as a guard track (or guard gap) GTa. In FIG. 4, for convenience of explanation, the shingled write magnetic recording band region SBA (SBA1) and the shingled write magnetic recording band region SBA (SBA2) are shown in a rectangular shape extending in the circumferential direction, but practically, they are curved along the circumferential direction.

The read/write controller 610 sequentially writes a plurality of tracks in the shingled write magnetic recording band region SBA1 in the user data region 10a according to a command from the host 100 or the like. The read/write controller 610 sequentially writes a plurality of tracks in the shingled write magnetic recording band region SBA2 which is away from the shingled write magnetic recording band region SBA1 in the radial direction by the guard gap GTa in the user data region 10a according to a command of the host 100 or the like.

The write counter 620 counts the number of times the data is written (hereinafter, may be referred to as the number of times of writing). The write counter 620 counts the number of times of writing (hereinafter, may be referred to as the number of times of proximity region writing) that data is written to a region (hereinafter, may be referred to as a proximity region) located within a particular range from a region of target (hereinafter, may be referred to as a target region) in the radial direction. For example, the write counter 620 counts the number of times of proximity region writing (hereinafter, may be referred to as the number of times of forward direction proximity region writing) that data is written in the proximity region (hereinafter, may be referred to as a forward direction proximity region) located within a particular range from the target region in the forward direction. For example, the write counter 620 counts the number of times of proximity region writing (hereinafter, may be referred to as the number of times of reverse direction proximity region writing) that data is written in the proximity region (hereinafter, may be referred to as a reverse direction proximity region) located within a particular range from the target region in the reverse direction. The write counter 620 may hold the number of times of writing as a table in a particular recording region, for example, the system area 10c, the volatile memory 70, the nonvolatile memory 80, the buffer memory 90, or the like of the disk 10.

When data is written to a proximity region located within a particular range from the target region in the radial direction, the write counter 620 increases (increments) the number of times of proximity region writing by a particular value. For example, the write counter 620 increases (increments) the number of times of proximity region writing by one when the data is written to the proximity region located within a particular range from the target region in the radial direction. When data is written to the forward direction proximity region, the write counter 620 increases (increments) the number of times of forward direction proximity region writing by a particular value. For example, the write counter 620 increases (increments) the number of times of forward direction proximity region writing by one when data is written to the forward direction proximity region. When data is written to the reverse direction proximity region, the write counter 620 increases (increments) the number of times of reverse direction proximity region writing by a particular value. For example, the write counter 620 increases (increments) the number of times of reverse direction proximity region writing by one when data is written to the reverse direction proximity region.

The write counter 620 counts the number of times of writing (hereinafter, may be referred to as the number of times of adjacent region writing) that data is written to the region (hereinafter, may be referred to as an adjacent region) that is adjacent to the target region in the radial direction. For example, the write counter 620 counts the number of times of adjacent region writing (hereinafter, may be referred to as the number of times of forward direction adjacent region writing) that data is written to the adjacent region (hereinafter, may be referred to as a forward direction adjacent region) adjacent to the target region in the forward direction. For example, the write counter 620 counts the number of times of adjacent region writing (hereinafter, may be referred to as the number of times of reverse direction adjacent region writing) that data is written to the adjacent region (hereinafter, may be referred to as a reverse direction adjacent region) adjacent to the target region in the reverse direction.

When data is written to an adjacent region located in the radial direction of the target region, the write counter 620 increases (increments) the number of times of adjacent region writing by a particular value. For example, when data is written to an adjacent region located in the radial direction of the target region, the write counter 620 increases (increments) the number of times of adjacent region writing by one. When data is written to the forward direction adjacent region, the write counter 620 increases (increments) the number of times of forward direction adjacent region writing by a particular value. For example, the write counter 620 increases (increments) the number of times of forward direction adjacent region writing by one when data is written to the forward direction adjacent region. When data is written to the reverse direction adjacent region, the write counter 620 increases (increments) the number of times of reverse direction adjacent region writing by a particular value. For example, the write counter 620 increases (increments) the number of times of reverse direction adjacent region writing by one when data is written to the reverse direction adjacent region.

The write counter 620 counts the number of times of writing (hereinafter, may be referred to as the number of times of adjacent band writing) that data is written to a band region (hereinafter, may be referred to as an adjacent band region) adjacent to the band region of target (hereinafter, may be referred to as a target band region) in the radial direction. In other words, the write counter 620 counts the number of times of writing (hereinafter, may be referred to as the number of times of adjacent band writing or the number of times of adjacent shingled write magnetic recording band writing) that data is written to the shingled write magnetic recording band region (hereinafter, it may be referred to as an adjacent band region or an adjacent shingled write magnetic recording band region) adjacent to the shingled write magnetic recording band region of target (hereinafter, may be referred to as a target band region or a target shingled write magnetic recording band region) in the radial direction. For example, the write counter 620 counts the number of times of adjacent band writing (hereinafter, may be referred to as the number of times of forward direction adjacent band writing) that data is written to the adjacent band region (hereinafter, may be referred to as a forward direction adjacent band region) adjacent to the target band region in the forward direction. In other words, the write counter 620 counts the number of times of adjacent shingled write magnetic recording band writing (hereinafter, may be referred to as the number of times of forward direction adjacent band writing or the number of times of forward direction adjacent shingled write magnetic recording band writing) that data is written to the adjacent shingled write magnetic recording band region (hereinafter, may be referred to as a forward direction adjacent band region or a forward direction adjacent shingled write magnetic recording band region) adjacent to the target shingled write magnetic recording band region in the forward direction. For example, the write counter 620 counts the number of times of adjacent band writing (hereinafter, may be referred to as the number of times of reverse direction adjacent band writing) that data is written to the adjacent band region (hereinafter, may be referred to as a reverse direction adjacent band region) adjacent to the target band region in the reverse direction. In other words, the write counter 620 counts the number of times of adjacent shingled write magnetic recording band writing (hereinafter, may be referred to as the number of times of adjacent shingled write magnetic recording band writing or the number of times of reverse direction adjacent band writing) that data is written to the adjacent shingled write magnetic recording band region (hereinafter, may be referred to as a reverse direction adjacent band region or a reverse direction adjacent shingled write magnetic recording band region) adjacent to the target shingled write magnetic recording band region in the reverse direction.

When data is written to the adjacent band region (adjacent shingled write magnetic recording band region) adjacent to the target band region (target shingled write magnetic recording band region) in the radial direction, the write counter 620 increases (increments) the number of times of adjacent band writing (the number of times of adjacent shingled write magnetic recording band writing) by a particular value. For example, when data is written to the adjacent band region (adjacent shingled write magnetic recording band region) located in the radial direction of the target band region (target shingled write magnetic recording band region), the write counter 620 increases (increments) the number of times of adjacent band writing (the number of times of adjacent shingled write magnetic recording band writing) by one. When data is written to the forward direction adjacent band region (forward direction adjacent shingled write magnetic recording band region), the write counter 620 increases (increments) the number of times of forward direction adjacent band writing (the number of times of forward direction adjacent shingled write magnetic recording band writing) by a particular value. For example, when data is written to the forward direction adjacent band region (forward direction adjacent shingled write magnetic recording band region), the write counter 620 increases (increments) the number of times of forward direction adjacent band writing (the number of times of forward direction adjacent shingled write magnetic recording band writing) by one. When data is written to the reverse direction adjacent band region (reverse direction adjacent shingled write magnetic recording band region), the write counter 620 increases (increments) the number of times of reverse direction adjacent band writing (the number of times of reverse direction adjacent shingled write magnetic recording band writing) by a particular value. For example, when data is written to the reverse direction adjacent band region (reverse direction adjacent shingled write magnetic recording band region), the write counter 620 increases (increments) the number of times of reverse direction adjacent band writing (the number of times of reverse direction adjacent shingled write magnetic recording band writing) by one.

The write counter 620 counts the number of times of writing (hereinafter, may be referred to as the number of times of proximity track writing) that data is written to the track (hereinafter, may be referred to as a proximity track) located within a particular range in the radial direction from the track of target (hereinafter, may be referred to as a target track) or the target band region (for example, the target shingled write magnetic recording band region). For example, the write counter 620 counts the number of times of proximity track writing (hereinafter, may be referred to as the number of times of forward direction proximity track writing) that data is written to the proximity track (hereinafter, may be referred to as a forward direction proximity track) located within a particular range in the forward direction from the target track or the target band region (for example, the target shingled write magnetic recording band region). For example, the write counter 620 counts the number of times of proximity track writing (hereinafter, may be referred to as the number of times of reverse direction proximity track writing) that data is written to the proximity track (hereinafter, may be referred to as a reverse direction proximity track) located within a particular range in the reverse direction from the target track or the target band region (for example, the target shingled write magnetic recording band region). It should be noted that when the data is written, a track that exerts influence of writing bleeding, leakage magnetic field, or the like on the target region may be detected by measurement at the manufacturing stage, and the detected track may be set as a proximity track. Further, when the data is written, a track that exerts influence of writing bleeding, leakage magnetic field, or the like on the target region may be detected at the operation process, and the detected track may be set as a proximity track.

When data is written to a proximity track located within a particular range in the radial direction from the target track or the target band region (for example, the target shingled write magnetic recording band region), the write counter 620 increases (increments) the number of times of proximity track writing by a particular value. For example, when data is written to a proximity track located within a particular range in the radial direction from the target track or the target band region (for example, the target shingled write magnetic recording band region), the write counter 620 increases (increments) the number of times of proximity track writing by one. When data is written to the forward direction proximity track, the write counter 620 increases (increments) the number of times of forward direction proximity track writing by a particular value. For example, when data is written to the forward direction proximity track, the write counter 620 increases (increments) the number of times of forward direction proximity track writing by one. When data is written to the reverse direction proximity track, the write counter 620 increases (increments) the number of times of reverse direction proximity track writing by a particular value. For example, when data is written to the reverse direction proximity track, the write counter 620 increases (increments) the number of times of reverse direction proximity track writing by one.

The write counter 620 counts the number of times of writing (hereinafter, may be referred to as the number of times of adjacent track writing) that data is written to the track (hereinafter, may be referred to as an adjacent track) adjacent to the target track or the target band region (hereinafter, may be referred to as a target shingled write magnetic recording band region) in the radial direction. For example, the write counter 620 counts the number of times of adjacent track writing (hereinafter, may be referred to as the number of times of forward direction adjacent track writing) that data is written to the adjacent track (hereinafter, may be referred to as a forward direction adjacent track) adjacent to the target track or the target band region (hereinafter, may be referred to as a target shingled write magnetic recording band region) in the forward direction. For example, the write counter 620 counts the number of times of adjacent track writing (hereinafter, may be referred to as the number of times of reverse direction adjacent track writing) that data is written to the adjacent track (hereinafter, may be referred to as a reverse direction adjacent track) adjacent to the target track or the target band region (hereinafter, may be referred to as a target shingled write magnetic recording band region) in the reverse direction.

When data is written to an adjacent track adjacent to the target track or the target band region (for example, the target shingled write magnetic recording band region) in the radial direction, the write counter 620 increases (increments) the number of times of adjacent track writing by a particular value. For example, when data is written to an adjacent track adjacent to the target track or the target band region (for example, the target shingled write magnetic recording band region) in the radial direction, the write counter 620 increases (increments) the number of times of adjacent track writing by one. When data is written to the forward direction adjacent track, the write counter 620 increases (increments) the number of times of forward direction adjacent track writing by a particular value. For example, when data is written to the forward direction adjacent track, the write counter 620 increases (increments) the number of times of forward direction adjacent track writing by one. When data is written to the reverse direction adjacent track, the write counter 620 increases (increments) the number of times of reverse direction adjacent track writing by a particular value. For example, when data is written to the reverse direction adjacent track, the write counter 620 increases (increments) the number of times of reverse direction adjacent track writing by one.

FIG. 5 is a schematic diagram showing an example of a table TB1 of the number of times of writing. The table TB1 shown in FIG. 5 includes a band region and the number of times of writing. The band region of the table TB1 in FIG. 5 includes a shingled write magnetic recording band region SBA1 and a shingled write magnetic recording band region SBA2. The shingled write magnetic recording band regions SBA1 and SBA2 shown in FIG. 5 are disposed adjacent to each other in the radial direction as shown in FIG. 4. For example, the shingled write magnetic recording band region SBA2 is adjacent to the shingled write magnetic recording band region SBA1 in the forward direction as shown in FIG. 4. The number of times of writing of the table TB1 in FIG. 5 includes the number of times of reverse direction adjacent band writing WCO1 and the number of times of forward direction adjacent band writing WCI1 corresponding to the shingled write magnetic recording band region SBA1, and the number of times of reverse direction adjacent band writing WCO2 and the number of times of forward direction adjacent band writing WCI2 corresponding to the shingled write magnetic recording band region SBA2. As the number of times of writing corresponding to the shingled write magnetic recording band region SBA1, only the number of times of reverse direction adjacent band writing WCO1 may be held in the table TB1. As the number of times of writing corresponding to the shingled write magnetic recording band region SBA2, only the number of times of reverse direction adjacent band writing WCO2 may be held in the table TB1. The number of times of reverse direction adjacent band writing WCO1 corresponding to the shingled write magnetic recording band region SBA1 corresponds to the number of times of writing that data is written to the band region adjacent to the shingled write magnetic recording band region SBA1 in the reverse direction. The number of times of forward direction adjacent band writing WCI1 corresponding to the shingled write magnetic recording band region SBA1 corresponds to the number of times of writing that data is written to the shingled write magnetic recording band region SBA2. The number of times of reverse direction adjacent band writing WCO2 corresponding to the shingled write magnetic recording band region SBA2 corresponds to the number of times of writing that data is written to the shingled write magnetic recording band region SBA1. Further, the number of times of forward direction adjacent band writing WCI2 corresponding to the shingled write magnetic recording band region SBA2 corresponds to the number of times of writing that data is written to the band region adjacent to the shingled write magnetic recording band region SBA2 in the forward direction. The number of times of writing of the table TB1 in FIG. 5 may include the number of times of reverse direction adjacent track writing corresponding to the shingled write magnetic recording band region SBA1, the number of times of forward direction adjacent track writing corresponding to the shingled write magnetic recording band region SBA1, the number of times of reverse direction adjacent track writing corresponding to the shingled write magnetic recording band region SBA2, and the number of times of forward direction adjacent track writing corresponding to the shingled write magnetic recording band region SBA2. The number of times of reverse direction adjacent track writing corresponding to the shingled write magnetic recording band region SBA1 corresponds to, for example, the number of times of writing that data is written to the last shingled write magnetic recording track, in the reverse direction adjacent shingled write magnetic recording band region, adjacent to the shingled write magnetic recording band region SBA1 in the reverse direction. The number of times of forward direction adjacent track writing corresponding to the shingled write magnetic recording band region SBA1 corresponds to, for example, the number of times of writing that data is written to the initial shingled write magnetic recording track of the shingled write magnetic recording band region SBA2. The number of times of reverse direction adjacent track writing corresponding to the shingled write magnetic recording band region SBA2 corresponds to, for example, the number of times of writing that data is written to the last shingled write magnetic recording track of the shingled write magnetic recording band region SBA1. The number of times of forward direction adjacent track writing corresponding to the shingled write magnetic recording band region SBA2 corresponds to, for example, the number of times of writing that data is written to the initial shingled write magnetic recording track in the forward direction adjacent shingled write magnetic recording band region adjacent to the shingled write magnetic recording band region SBA2 in the forward direction.

In the example shown in FIG. 5, the write counter 620 increases (or increments) the number of times of reverse direction adjacent band writing WCO2 by one when data is written to the shingled write magnetic recording band region (reverse direction adjacent shingled write magnetic recording band region) SBA1. In other words, the write counter 620 adds one to the number of times of reverse direction adjacent band writing WCO2 when data is written to the shingled write magnetic recording band region SBA1.

The write counter 620 increases (or increments) the number of times of reverse direction adjacent track writing by one when data is written to the last shingled write magnetic recording track of the shingled write magnetic recording band region (reverse direction adjacent shingled write magnetic recording band region) SBA1. In other words, the write counter 620 may add one to the number of times of reverse direction adjacent track writing when data is written to the last shingled write magnetic recording track of the shingled write magnetic recording band region SBA1.

In the example shown in FIG. 5, when data is written to the shingled write magnetic recording band region (forward direction adjacent shingled write magnetic recording band region) adjacent to the shingled write magnetic recording band region SBA2 in the forward direction, the write counter 620 increases (or increments) the number of times of forward direction adjacent band writing WCI2 by one. In other words, the write counter 620 adds one to the number of times of forward direction adjacent band writing WCI2 when data is written to the shingled write magnetic recording band region adjacent to the shingled write magnetic recording band region SBA2 in the forward direction.

When data is written to the initial shingled write magnetic recording track of the shingled write magnetic recording band region (forward direction adjacent shingled write magnetic recording band region) adjacent to the shingled write magnetic recording band region SBA2 in the forward direction, the write counter 620 may increase (or increment) the number of times of forward direction adjacent track writing by one. In other words, the write counter 620 may add one to the number of times of forward direction adjacent track writing when data is written to the initial shingled write magnetic recording track in the shingled write magnetic recording band region adjacent to the shingled write magnetic recording band region SBA2 in the forward direction.

In the example shown in FIG. 5, when data is written to the shingled write magnetic recording band region (reverse direction adjacent shingled write magnetic recording band region) adjacent to the shingled write magnetic recording band region SBA1 in the reverse direction, the write counter 620 increases (or increments) the number of times of reverse direction adjacent band writing WCO1 by one. In other words, the write counter 620 adds one to the number of times of reverse direction adjacent band writing WCO1 when data is written to the shingled write magnetic recording band region adjacent to the shingled write magnetic recording band region SBA1 in the reverse direction.

When data is written to the last shingled write magnetic recording track, of the shingled write magnetic recording band region (reverse direction adjacent shingled write magnetic recording band region), adjacent to the shingled write magnetic recording band region SBA1 in the reverse direction, the write counter 620 may increase (or increment) the number of times of reverse direction adjacent track writing by one. In other words, the write counter 620 may add one to the number of times of reverse direction adjacent track writing when data is written to the last shingled write magnetic recording track, in the shingled write magnetic recording band region, adjacent to the shingled write magnetic recording band region SBA1 in the reverse direction.

In the example shown in FIG. 5, the write counter 620 increases (or increments) the number of times of forward direction adjacent band writing WCI1 by one when data is written to the shingled write magnetic recording band region (forward direction adjacent shingled write magnetic recording band region) SBA2. In other words, the write counter 620 adds one to the number of times of forward direction adjacent band writing WCI1 when data is written to the shingled write magnetic recording band region SBA2.

The write counter 620 may increase (or increment) the number of times of forward direction adjacent track writing by one when data is written to the initial shingled write magnetic recording track of the shingled write magnetic recording band region (forward direction adjacent shingled write magnetic recording band region) SBA2. In other words, the write counter 620 may add one to the number of times of forward direction adjacent track writing when data is written to the initial shingled write magnetic recording track of the shingled write magnetic recording band region SBA2.

The rewrite controller 630 performs a process of renewing the same data as the data written to a particular region to this region (hereinafter, may be referred to as a refresh process), or a process of overwriting or rewriting the data to the particular region (hereinafter, may be referred to as a overwrite process or rewrite process). Hereinafter, the refresh process and the overwrite process (rewrite process) may be collectively referred to as rewriting or a rewrite process. When it is determined that the number of times of writing corresponding to a particular region exceeds the threshold value of the number of times of writing corresponding to this region (hereinafter, may be referred to as a writing count threshold value), the rewrite controller 630 performs the rewrite process on this region. When it is determined that the number of times of writing corresponding to a particular region exceeds the writing count threshold value corresponding to this region, the rewrite controller 630 rewrites part of this region. In other words, when it is determined that the number of times of writing corresponding to the particular region exceeds the writing count threshold value corresponding to this region, the rewrite controller 630 rewrites the data having a capacity equal to or less than the capacity preset as a format to this region. When the rewrite controller 630 performs the rewrite process on the particular region, the rewrite controller 630 resets the number of times of writing in this region, for example, sets it to zero.

When it is determined that the number of times of proximity region writing (the number of times of forward direction proximity region writing or the number of times of reverse direction proximity region writing) corresponding to the target region has exceeded the writing count threshold value of the number of times of proximity region writing corresponding to this target region (hereinafter, the proximity region writing count threshold value), the rewrite controller 630 performs the rewrite process on this target region. When it is determined that the number of times of proximity region writing corresponding to the target region has exceeded the proximity region writing count threshold value corresponding to the target region, the rewrite controller 630 rewrites part of the target region. In other words, when it is determined that the number of times of proximity region writing corresponding to the target region has exceeded the proximity region writing count threshold value corresponding to this target region, the rewrite controller 630 rewrites the data having a capacity equal to or less than the capacity preset as a format to this target region.

When it is determined that the number of times of adjacent region writing (the number of times of forward direction adjacent region writing or the number of times of reverse direction adjacent region writing) corresponding to the target region has exceeded the writing count threshold value of the number of times of adjacent region writing corresponding to this target region (hereinafter, the adjacent region writing count threshold value), the rewrite controller 630 performs the rewrite process on this target region. When it is determined that the number of times of adjacent region writing corresponding to the target region has exceeded the adjacent region writing count threshold value corresponding to the target region, the rewrite controller 630 rewrites part of the target region. In other words, when it is determined that the number of times of proximity region writing corresponding to the target region has exceeded the proximity region writing count threshold value corresponding to this target region, the rewrite controller 630 rewrites the data having a capacity equal to or less than the capacity preset as a format to this target region.

When it is determined that the number of times of adjacent band writing (the number of times of forward direction adjacent band writing or the number of times of reverse direction adjacent band writing) corresponding to the target band region has exceeded the writing count threshold value of the number of times of adjacent band writing corresponding to this target band region (hereinafter, the adjacent band writing count threshold value), the rewrite controller 630 performs the rewrite process on this target band region. When it is determined that the number of times of adjacent band writing corresponding to the target band region has exceeded the adjacent band writing count threshold value corresponding to the target band region, the rewrite controller 630 rewrites part (sector or track) of the target band region. In other words, when it is determined that the number of times of adjacent band writing corresponding to the target band region has exceeded the adjacent band writing count threshold value corresponding to the target band region, the rewrite controller 630 rewrites the data having a capacity equal to or less than the capacity preset as a format to this target band region.

For example, when it is determined that the number of times of adjacent shingled write magnetic recording band writing (the number of times of forward direction adjacent shingled write magnetic recording band writing or the number of times of reverse direction adjacent shingled write magnetic recording band writing) corresponding to the target shingled write magnetic recording band region has exceeded the writing count threshold value (hereinafter, may be referred to as an adjacent shingled write magnetic recording band writing count threshold value) of the number of times of adjacent band writing corresponding to this target shingled write magnetic recording band region, the rewrite controller 630 performs the rewrite process on this target shingled write magnetic recording band region. When it is determined that the number of times of adjacent shingled write magnetic recording band writing corresponding to the target shingled write magnetic recording band region has exceeded the adjacent shingled write magnetic recording band writing count threshold value corresponding to the target shingled write magnetic recording band region, the rewrite controller 630 rewrites part (sector or track) of the target shingled write magnetic recording band region. In other words, when it is determined that the number of times of adjacent shingled write magnetic recording band writing corresponding to the target shingled write magnetic recording band region has exceeded the adjacent shingled write magnetic recording band writing count threshold value corresponding to the target shingled write magnetic recording band region, the rewrite controller 630 rewrites the data having a capacity equal to or less than the capacity preset as a format to this target shingled write magnetic recording band region.

For example, when it is determined that the number of times of forward direction adjacent shingled write magnetic recording band writing has exceeded the adjacent shingled write magnetic recording band writing count threshold value corresponding to the target shingled write magnetic recording band region, the rewrite controller 630 rewrites the last shingled write magnetic recording track in the target shingled write magnetic recording band region at the same position.

For example, when it is determined that the number of times of reverse direction adjacent band writing has exceeded the adjacent shingled write magnetic recording band writing count threshold value corresponding to the target shingled write magnetic recording band region, the rewrite controller 630 shifts (offsets) the initial shingled write magnetic recording track in the target shingled write magnetic recording band region in the reverse direction to perform rewriting. In other words, when it is determined that the number of times of reverse direction adjacent band writing has exceeded the adjacent shingled write magnetic recording band writing count threshold value corresponding to the target shingled write magnetic recording band region, the rewrite controller 630 performs positioning to the target position (hereinafter, may be referred to as a rewrite position) when performing writing after rewriting this initial shingled write magnetic recording track offset in the reverse direction from the target position (hereinafter, may be referred to as an original write position) when performing writing before rewriting the initial shingled write magnetic recording track in this target shingled write magnetic recording band region to rewrite this initial shingled write magnetic recording track. For example, when it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 shifts (offsets) this initial shingled write magnetic recording track from the original write position in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 may shift (offset) this initial shingled write magnetic recording track in the target shingled write magnetic recording band region from the original write position in the reverse direction by the overlapping range (hereinafter, may be referred to as an initial overlapping range) or more between the initial shingled write magnetic recording track in this target shingled write magnetic recording band region and a track with which this initial shingled write magnetic recording track is overwritten, and the sum or less of the initial overlapping range of the target shingled write magnetic recording band region and the guard track to perform rewriting. When it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 may shift (offset) this initial shingled write magnetic recording track in this target shingled write magnetic recording band region from the original write position in the reverse direction by the initial overlapping range or more of the target shingled write magnetic recording band region, and the sum or less of the initial overlapping range of the target shingled write magnetic recording band region, the guard track, and the last overlapping range, of the shingled write magnetic recording band region, adjacent to the target shingled write magnetic recording band region in the reverse direction to perform rewriting.

When it is determined that the number of times of proximity track writing (the number of times of forward direction proximity track writing or the number of times of reverse direction proximity track writing) corresponding to the target track or target band region has exceeded the writing count threshold value (hereinafter, may be referred to as a proximity track writing count threshold value) of the number of times of proximity track writing corresponding to the target track or the target band region, the rewrite controller 630 performs the rewrite process on this target track or this target band region. When it is determined that the number of times of proximity track writing corresponding to the target track or the target band region has exceeded the proximity track writing count threshold value corresponding to the target track or the target band region, the rewrite controller 630 rewrites the target track or part (sector or track) of the target band region. In other words, when it is determined that the number of times of proximity track writing corresponding to the target track or the target band region has exceeded the proximity track writing count threshold value corresponding to the target track or the target band region, the rewrite controller 630 rewrites the data having a capacity equal to or less than the capacity preset as a format to this target track or this target band region.

For example, when it is determined that the number of times of forward direction proximity track writing has exceeded the proximity track writing count threshold value corresponding to the target shingled write magnetic recording band region, the rewrite controller 630 rewrites the last shingled write magnetic recording track in the target shingled write magnetic recording band region at the same position.

For example, when it is determined that the number of times of reverse direction proximity track writing has exceeded the proximity track writing count threshold value corresponding to the target shingled write magnetic recording band region, the rewrite controller 630 shifts (offsets) the initial shingled write magnetic recording track in the target shingled write magnetic recording band region in the reverse direction to perform rewriting. In other words, when it is determined that the number of times of reverse direction proximity track writing has exceeded the proximity track writing count threshold value corresponding to the target shingled write magnetic recording band region, the rewrite controller 630 performs positioning at the rewrite position offset from the original write position in the reverse direction to rewrite this initial shingled write magnetic recording track. For example, when it is determined that the number of times of reverse direction proximity track writing has exceeded the proximity track writing count threshold value corresponding to the target shingled write magnetic recording band region, the rewrite controller 630 shifts (offsets) this initial shingled write magnetic recording track from the original write position in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction proximity track writing has exceeded the proximity track writing count threshold value corresponding to the target shingled write magnetic recording band region, the rewrite controller 630 may shift (offset) this initial shingled write magnetic recording track in this target shingled write magnetic recording band region from the original write position in the reverse direction by the initial overlapping range or more of the target shingled write magnetic recording band region and the sum or less of the initial overlapping range of the target shingled write magnetic recording band region and the guard track to perform rewriting. When it is determined that the number of times of reverse direction proximity track writing has exceeded the proximity track writing count threshold value corresponding to the target shingled write magnetic recording band region, the rewrite controller 630 may shift (offset) the initial shingled write magnetic recording track in this target shingled write magnetic recording band region from the original write position in the reverse direction by the initial overlapping range or more of the target shingled write magnetic recording band region, and the sum or less of the initial overlapping range of the target shingled write magnetic recording band region, the guard track, and the last overlapping range, of the shingled write magnetic recording band region, adjacent to the target shingled write magnetic recording band region in the reverse direction to perform rewriting.

When it is determined that the number of times of adjacent track writing (the number of times of forward direction adjacent track writing or the number of times of reverse direction adjacent track writing) corresponding to the target track or target band region has exceeded the writing count threshold value (hereinafter, may be referred to as an adjacent track writing count threshold value) of the number of times of adjacent track writing corresponding to the target track or the target band region, the rewrite controller 630 performs the rewrite process on this target track or this target band region. When it is determined that the number of times of adjacent track writing corresponding to the target track or the target band region has exceeded the adjacent track writing count threshold value corresponding to the target track or the target band region, the rewrite controller 630 rewrites the target track or part (sector or track) of the target band region. In other words, when it is determined that the number of times of adjacent track writing corresponding to the target track or the target band region has exceeded the adjacent track writing count threshold value corresponding to the target track or the target band region, the rewrite controller 630 rewrites the data having a capacity equal to or less than the capacity preset as a format to this target track or this target band region.

For example, when it is determined that the number of times of forward direction adjacent track writing has exceeded the adjacent track writing count threshold value corresponding to the target shingled write magnetic recording band region, the rewrite controller 630 rewrites the last shingled write magnetic recording track in the target shingled write magnetic recording band region at the same position.

For example, when it is determined that the number of times of reverse direction adjacent track writing has exceeded the adjacent track writing count threshold value corresponding to the target shingled write magnetic recording band region, the rewrite controller 630 shifts (offsets) the initial shingled write magnetic recording track in the target shingled write magnetic recording band region in the reverse direction to perform rewriting. In other words, when it is determined that the number of times of a reverse direction adjacent track writing has exceeded the adjacent track writing count threshold value corresponding to the target shingled write magnetic recording band region, the rewrite controller 630 performs positioning at the rewrite position offset from the original write position in the reverse direction to rewrite this initial shingled write magnetic recording track. For example, when it is determined that the number of times of reverse direction adjacent track writing has exceeded the adjacent track writing count threshold value corresponding to the target shingled write magnetic recording band region, the rewrite controller 630 shifts (offsets) this initial shingled write magnetic recording track from the original write position in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction adjacent track writing has exceeded the adjacent track writing count threshold value corresponding to the target shingled write magnetic recording band region, the rewrite controller 630 may shift (offset) this initial shingled write magnetic recording track of this target shingled write magnetic recording band region from the original write position in the reverse direction by the initial overlapping range or more of the target shingled write magnetic recording band region and the sum or less of the initial overlapping range of the target shingled write magnetic recording band region and the guard track to perform rewriting. When it is determined that the number of times of reverse direction adjacent track writing has exceeded the adjacent track writing count threshold value corresponding to the target shingled write magnetic recording band region, the rewrite controller 630 may shift (offset) this initial shingled write magnetic recording track of this target shingled write magnetic recording band region from the original write position in the reverse direction by the initial overlapping range or more of the target shingled write magnetic recording band region and the sum or less of the initial overlapping range of the target shingled write magnetic recording band region, the guard track, and the last overlapping range of the shingled write magnetic recording band region adjacent to the target shingled write magnetic recording band region in the reverse direction to perform rewriting.

When rewriting the initial shingled write magnetic recording track in the target shingled write magnetic recording band region, the rewrite controller 630 may performing rewriting so that the track width of the initial shingled write magnetic recording track is twice or less the track pitch.

The proximity region writing count threshold value, the adjacent region writing count threshold value, the adjacent band writing count threshold value, the adjacent shingled write magnetic recording band writing count threshold value, the proximity track writing count threshold value, the adjacent track writing count threshold value, and the like may be the same or different. In addition, in the proximity region writing count threshold value, the adjacent region writing count threshold value, the adjacent band writing count threshold value, the adjacent shingled write magnetic recording band writing count threshold value, the proximity track writing count threshold value, the adjacent track writing count threshold value, and the like, the value corresponding to the number of times of writing that data is written in the forward direction may be the same as, or different from the value corresponding to the number of times of writing that data is written in the reverse direction.

Figure 6:
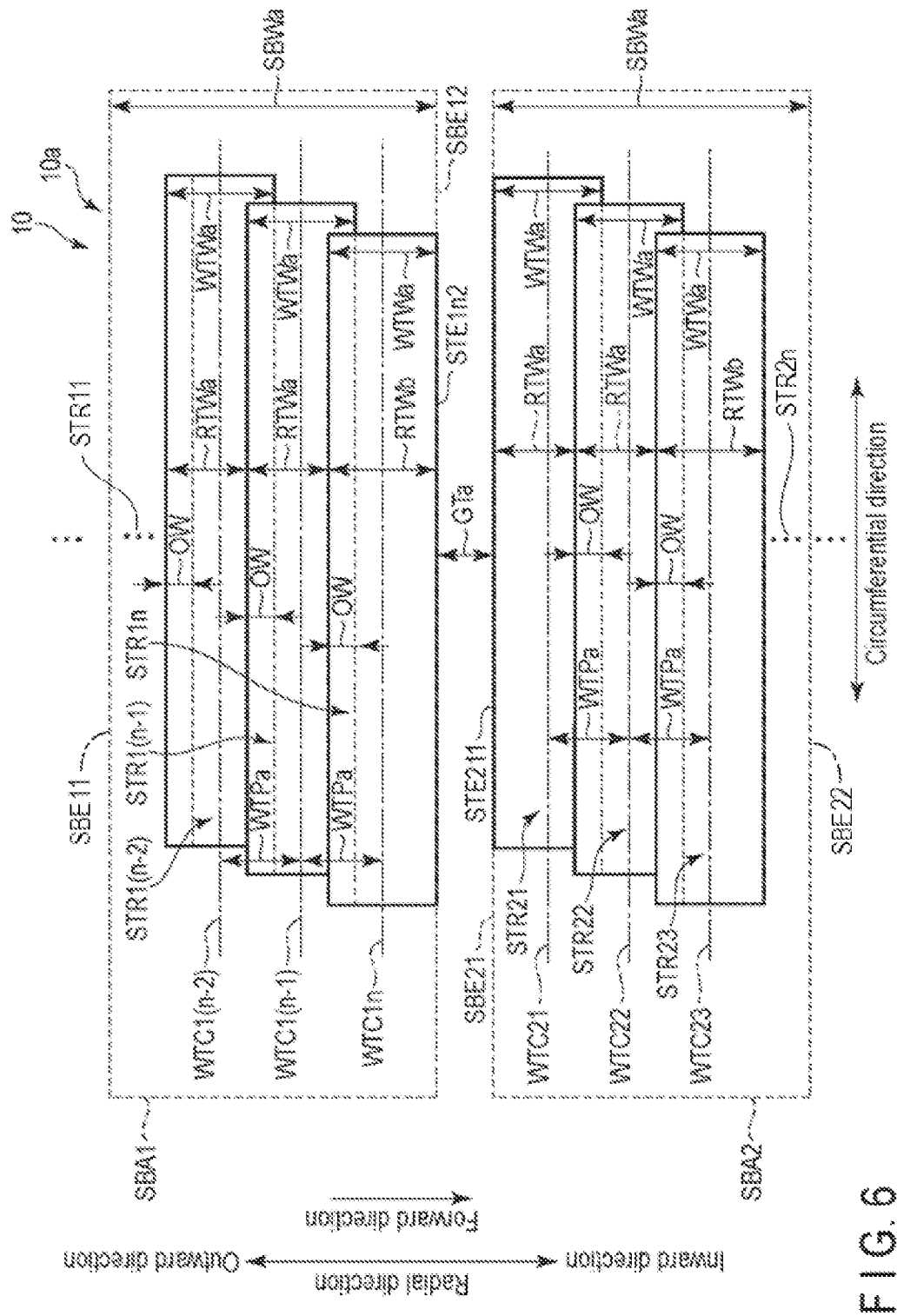
FIG. 6 is a schematic view showing an example of a write process in the shingled write magnetic recording band region.

FIG. 6 is a schematic diagram showing an example of the write process of the shingled write magnetic recording band regions SBA1 and SBA2. FIG. 6 shows two shingled write magnetic recording band regions SBA1 and SBA2 that are adjacent to each other in the radial direction. The shingled write magnetic recording band regions SBA1 and SBA2 shown in FIG. 6 correspond to the shingled write magnetic recording band regions SBA1 and SBA2 shown in FIG. 4. In the example shown in FIG. 6, the shingled write magnetic recording band region SBA1 (may be referred to as a first region) includes an end SBE11 (may be referred to as a first end) in the reverse direction and an end SBE 12 (may be referred to as a first other end) in the forward direction. The shingled write magnetic recording band region SBA1 includes . . . , the track STR1($n$–2), the track STR1($n$–1), and the track STR1$n$. In the shingled write magnetic recording band region SBA1, . . . , and the track STR1($n$–2) to the track STR1$n$ are continuously overwritten in the radial direction. In the example shown in FIG. 6, the track STR1$n$ corresponds to the last shingled write magnetic recording track (may be referred to as a first last track) . . . , and the track STR1($n$–2) to the track STR1$n$ are each written with the track pitch WTPa in the radial direction. Note that . . . , and the track STR1($n$–2) to the track STR1$n$ may be written with different track pitches in the radial direction. In the example shown in FIG. 6, the track center WTC1($n$–2) of the track STR1($n$–2) and the track center WTC1($n$–1) of the track STR1($n$–1) are written away with the track pitch WTPa in the radial direction. The track center WTC1($n$–1) of the track STR1($n$–1) and the track center WTC1$n$ of the track STR1$n$ are written away with the track pitch WTPa in the radial direction. Also . . . , and the track STR1($n$–2) to the track STR1$n$ are each written so as to overlap part of the previous track in the radial direction. In FIG. 6, . . . , and the track STR1($n$–2) to the track STR1$n$ are overwritten in the overlapping range OW with the previous track. In FIG. 6, the end SBE12 of the shingled write magnetic recording band region SBA1 in the forward direction corresponds to the end STE1$n$2 of the last shingled write magnetic recording track STR1$n$ in the forward direction. In the example shown in FIG. 6, the shingled write magnetic recording band region SBA2 may be referred to as a second region) includes an end SBE21 (may be referred to as a second end) in the reverse direction and an end SBE 22 (may be referred to as a second other end) in the forward direction. The shingled write magnetic recording band region SBA2 includes the track STR21, the track STR22, the track STR23, . . . . In the shingled write magnetic recording band region SBA2, the track STR21 to the track STR23, . . . are continuously overwritten in the radial direction. In the example shown in FIG. 6, the track STR21 corresponds to the initial shingled write magnetic recording track may be referred to as a second initial track). The track STR21 to the track STR23, . . . are each written with the track pitch WTPa in the radial direction. The track STR21 to the track STR23 may be written with different track pitches in the radial direction. In the example shown in FIG. 6, the track center WTC21 of the track STR21 and the track center WTC22 of the track STR22 are written apart with the track pitch WTPa in the radial direction. The track center WTC22 of the track STR22 and the track center WTC23 of the track STR23 are written away with the track pitch WTPa in the radial direction. Further, the track STR21 to the track STR22, . . . are each written so as to overlap part of the previous track in the radial direction. In FIG. 6, the track STR21 to the track STR22, . . . are each overwritten in the overlapping range OW with the previous track. In FIG. 6, the end SBE21 of the shingled write magnetic recording band region SBA2 in the reverse direction corresponds to the end STE211 of the initial shingled write magnetic recording track STR21 in the reverse direction. In the example shown in FIG. 6, the shingled write magnetic recording band regions SBA1 and SBA2 are disposed with the guard track GTa (may be referred to as a gap in a first direction) disposed therebetween. That is, in FIG. 6, the last shingled write magnetic recording track STR1$n$ and the initial shingled write magnetic recording track STR21 are disposed with the guard track GTa placed therebetween.

In the example shown in FIG. 6, the MPU 60 shingled-write-magnetic-records the initial shingled write magnetic recording track STR11 (may be referred to as a first initial track), . . . , the track STR1($n$–2), the track STR1($n$–1), and the last shingled write magnetic recording tracks STR1$n$ sequentially in the forward direction in the shingled write magnetic recording band region SBA1 in the order described. The MPU 60 writes the initial shingled write magnetic recording track STR21 in the shingled write magnetic recording band region SBA2 from the shingled write magnetic recording band region SBA1 in the forward direction with the guard track GTa placed. The MPU 60 shingled-write-magnetic-records the initial shingled write magnetic recording track STR21, the track STR22, the track STR23, . . . , and the last shingled write magnetic recording track STR2$n$ (may be referred to as a second last track) sequentially in the forward direction in the shingled write magnetic recording band region SBA2 in the order described.

In the example shown in FIG. 6, the MPU 60 increases the number of times of writing (the number of times of reverse direction adjacent band writing) corresponding to the shingled write magnetic recording band region SBA2 by one when at least one track is shingled-write-magnetic-recorded in the shingled write magnetic recording band region SBA1. For example, when writing at least one of . . . , and the track STR1($n$–2) to the track STR1$n$ in the shingled write magnetic recording band region SBA1 disposed within a particular range in the reverse direction from the end SBE21 of the shingled write magnetic recording band region SBA2 in the reverse direction, the MPU 60 increases the number of times of writing (the number of times of reverse direction proximity track writing) corresponding to the shingled write magnetic recording band region SBA2 by one. Further, for example, the MPU 60 increases the number of times of writing (the number of times of reverse direction adjacent track writing) corresponding to the shingled write magnetic recording band region SBA2 by one when writing the last shingled write magnetic recording track STR1$n$ in the shingled write magnetic recording band region SBA1.

Figure 7:
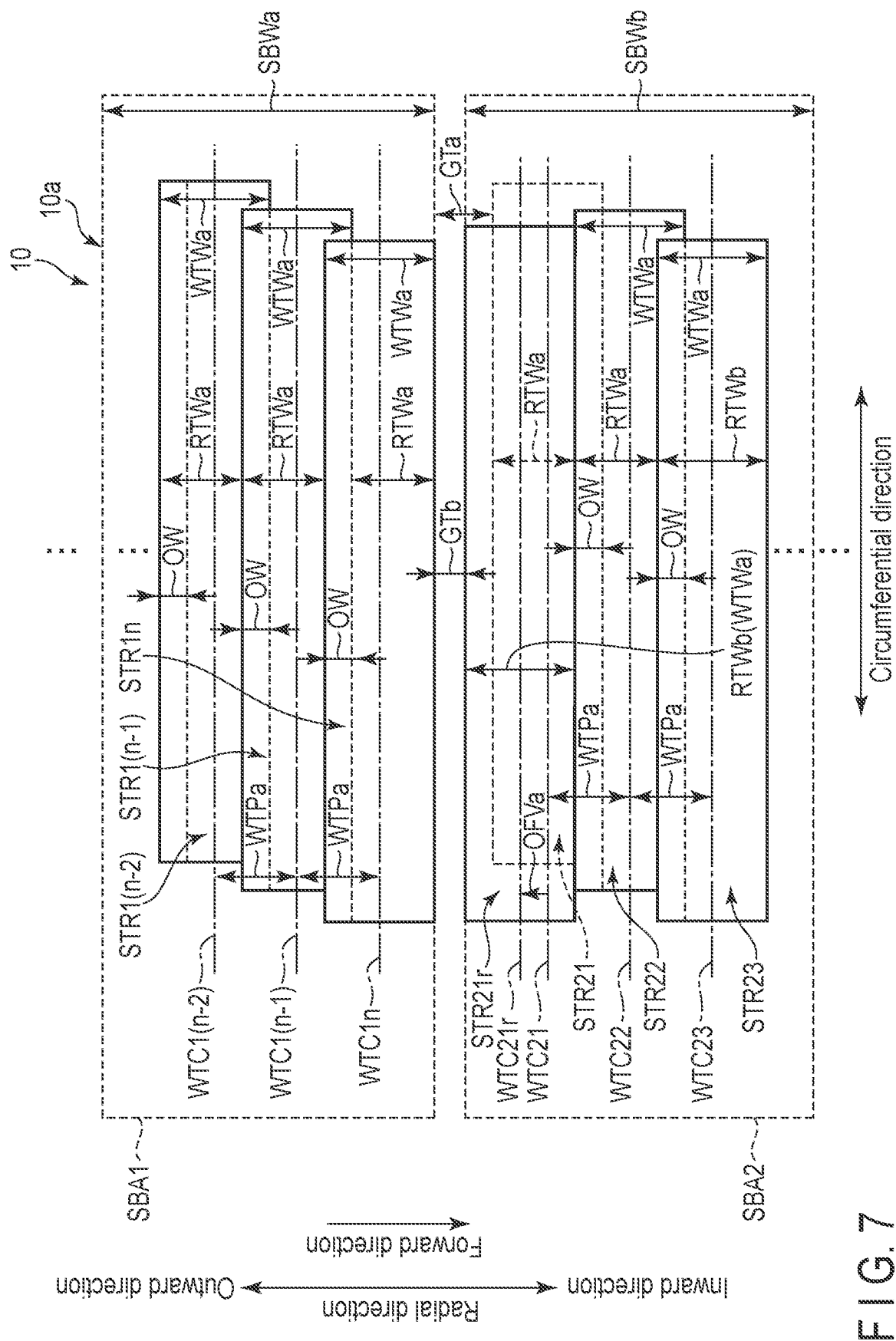
FIG. 7 is a schematic view showing an example of a rewrite process according to the first embodiment.

FIG. 7 is a schematic view showing an example of the rewrite process according to the present embodiment. FIG. 7 corresponds to FIG. 6. FIG. 7 shows the track STR21$r$, which rewrites the track STR21 in the shingled write magnetic recording band region SBA2. The data written to the track STR21$r$ corresponds to the data written to the track STR21. The track center WTC21$r$ of the track STR21$r$ corresponds to a radial position shifted (offset) by the shift amount (or offset amount) OFVa in the reverse direction from the track center WTC21 of the track STR21, for example, toward the shingled write magnetic recording band region SBA1. In other words, the track STR21r is disposed by shifting the track STR21 by the shift amount OFVa in the reverse direction. The shift amount OFVa is, for example, equal to or greater than the overlapping range OW between the tracks STR21 and STR22, and equal to or less than the overlapping range OW between the tracks STR21 and STR22+the guard track GTa. The shift amount OFVa is, for example, equal to or greater than the overlapping range OW between tracks STR21 and STR22, and equal to or less than the overlapping range OW between tracks STR21 and STR22+the overlapping range OW between the tracks STR1 (n−1) and STR1n+the guard track GTa. The shift amount OFVa may be less than the overlapping range OW between the tracks STR21 and STR22 as long as the track STR22 can be read. Also, as long as track STR1n can be read, the shift amount OFVa may be larger than the overlapping range OW between tracks STR21 and STR22+the guard track GTa, or may be larger than the overlapping range OW between the tracks STR21 and STR22+the overlapping range OW between the tracks STR1(n−1) and STR1n+the guard track GTa. In the example shown in FIG. 7, the shift amount OFVa corresponds to the overlapping range OW between the tracks STR21 and STR22. The shingled write magnetic recording bandwidth SBWb of the shingled write magnetic recording band region SBA2 shown in FIG. 7 is larger than the shingled write magnetic recording bandwidth SBWa of the shingled write magnetic recording band region SBA2 shown in FIG. 6 by the amount by which the initial shingled write magnetic recording track STR21 is shifted in the reverse direction, for example, by the shift amount OFVa. The guard track GTb shown in FIG. 7 is smaller than the guard track GTa shown in FIG. 6 by the amount by which the initial shingled write magnetic recording track STR21 is shifted in the reverse direction, for example, by the shift amount OFVa. The track width RTWb of the track STR21r is larger than the track width RTWa of the track STR21 overwritten with the track STR22. In the example shown in FIG. 7, the track width RTWb of the track STR21r is larger than the track width RTWa of the track STR21 by the overlapping range OW between the tracks STR21 and STR22.

When it is determined that the number of times of writing (the number of times of reverse direction adjacent shingled write magnetic recording band writing) that data is written to the shingled write magnetic recording band region SBA1 exceeds the writing count threshold value (adjacent shingled write magnetic recording band writing count threshold value) corresponding to the shingled write magnetic recording band region SBA2, the MPU 60 shifts the initial shingled write magnetic recording track STR21 in the shingled write magnetic recording band region SBA2 in the reverse direction by, for example, the shift amount OFVa toward the shingled write magnetic recording band region SBA1 to rewrite the initial shingled write magnetic recording track STR21r by the conventional magnetic recording type.

When it is determined that the number of times of writing (the number of times of reverse direction proximity track writing) that at least one track of . . . , and the track STR1(n−2) to the track STR1n in the shingled write magnetic recording band region SBA2 is written exceeds the writing count threshold value (proximity track writing count threshold value) corresponding to the shingled write magnetic recording band region SBA2, the MPU 60 shifts the initial shingled write magnetic recording track STR21 in the shingled write magnetic recording band region SBA2 in the reverse direction by, for example, the shift amount OFVa toward the shingled write magnetic recording band region SBA1 to rewrite the initial shingled write magnetic recording track STR21r by the conventional magnetic recording type.

When it is determined that the number of times of writing (the number of times of reverse direction adjacent track writing) that the track STR1n in the shingled write magnetic recording band region SBA1 is written exceeds the writing count threshold value (adjacent track writing count threshold value) corresponding to the shingled write magnetic recording band region SBA2, the MPU 60 shifts the initial shingled write magnetic recording track STR21 in the shingled write magnetic recording band region SBA2 in the reverse direction by, for example, the shift amount OFVa toward the shingled write magnetic recording band region SBA1 to rewrite the initial shingled write magnetic recording track STR21r by the conventional magnetic recording type.

Figure 8:
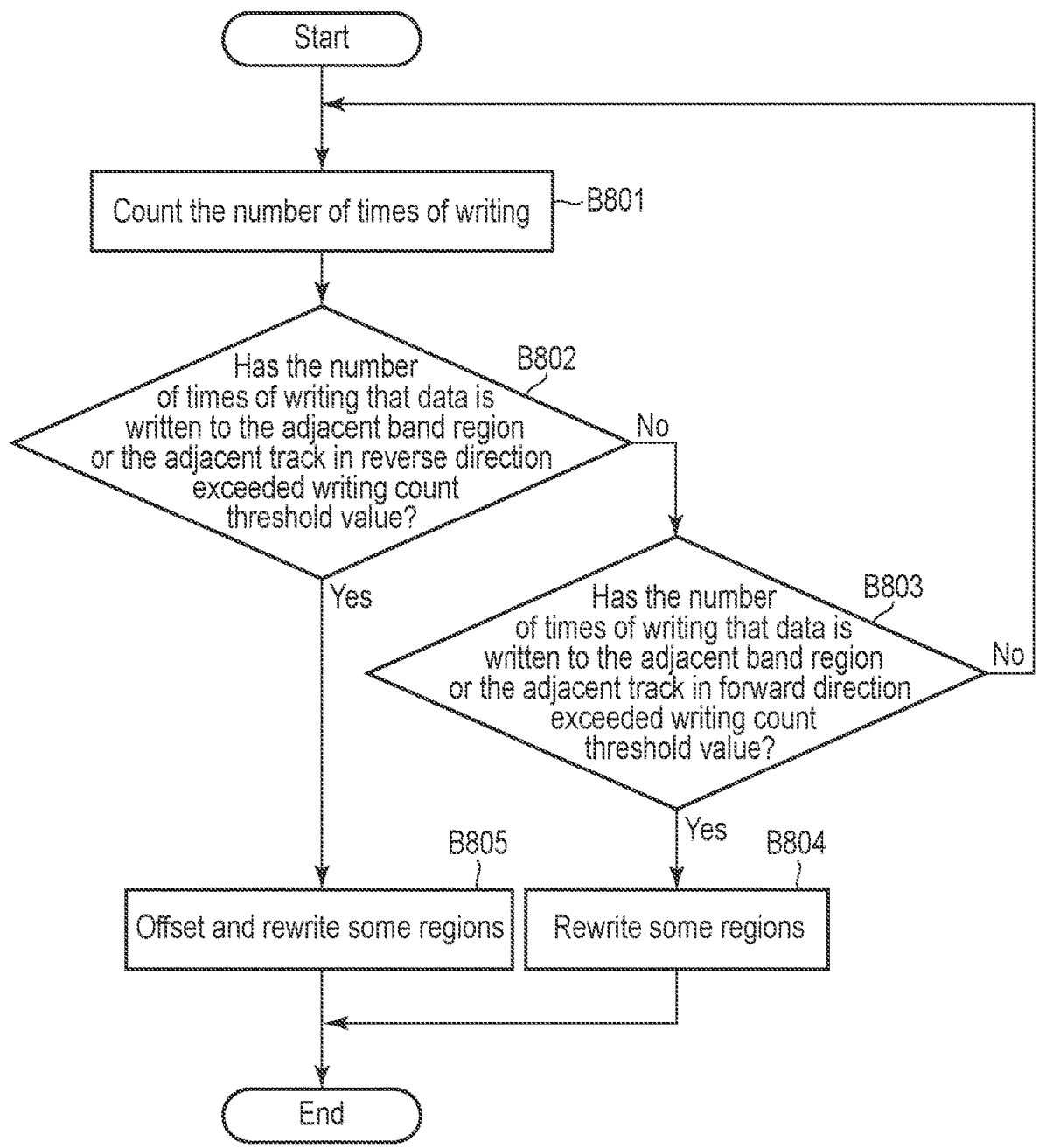
FIG. 8 is a flowchart showing an example of a rewrite processing method according to the first embodiment.

FIG. 8 is a flowchart showing an example of the rewrite processing method according to the present embodiment.

The MPU 60 counts the number of times of writing corresponding to the target band region (B801). For example, the MPU 60 counts the number of times of writing (the number of times of reverse direction adjacent shingled write magnetic recording band writing and the number of times of forward direction adjacent shingled write magnetic recording band writing) that data is written to the shingled write magnetic recording band region (reverse direction adjacent shingled write magnetic recording band region and forward direction adjacent shingled write magnetic recording band region) adjacent to the target shingled write magnetic recording band region in the radial direction. Further, for example, the MPU 60 counts the number of times of writing (the number of times of reverse direction adjacent track writing and the number of times of forward direction adjacent track writing) that data is written to the adjacent track (reverse direction adjacent track and forward direction adjacent track) adjacent to the target shingled write magnetic recording band region in the radial direction.

The MPU 60 determines whether the number of times of writing that data is written to the adjacent band region or the adjacent track in the reverse direction corresponding to the target band region has exceeded the writing count threshold value or is equal to or less than the writing count threshold value (B802). For example, the MPU 60 determines whether the number of times of writing (the number of times of reverse direction adjacent shingled write magnetic recording band writing) that data is written to the shingled write magnetic recording band region (reverse direction adjacent shingled write magnetic recording band region) adjacent to the target shingled write magnetic recording band region in the reverse direction exceeds the writing count threshold value (adjacent shingled write magnetic recording band writing count threshold value) of the number of times of writing corresponding to this target shingled write magnetic recording band region, or is equal to or less than the writing count threshold value (adjacent shingled write magnetic recording band writing count threshold value). For example, in the MPU 60 determines whether the number of times of writing (the number of times of reverse direction adjacent track writing) that data is written to the adjacent track (reverse direction adjacent track) adjacent to the target shingled write magnetic recording band region in the reverse direction exceeds the writing count threshold value (adjacent track writing count threshold value) of the number of times of writing corresponding to the target shingled write magnetic recording band region or is equal to or less than the writing count threshold value (adjacent track writing count threshold value).

When it is determined that the number of times of writing that data is written in the reverse direction corresponding to the target band region is equal to or less than the writing count threshold value (NO in B802), the MPU 60 determines whether the number of times of writing that data is written to the adjacent band region or the adjacent track in the forward direction corresponding to the target band region has exceeded the writing count threshold value, or is equal to or less than the writing count threshold value (B803). For example, the MPU 60 determines whether the number of times of writing (the number of times of forward direction adjacent shingled write magnetic recording band writing) that data is written to the shingled write magnetic recording band region (reverse direction adjacent shingled write magnetic recording band region) adjacent to the target shingled write magnetic recording band region in the forward direction exceeds the writing count threshold value (adjacent shingled write magnetic recording band writing count threshold value) of the number of times of writing corresponding to this target shingled write magnetic recording band region, or is equal to or less than the writing count threshold value (adjacent shingled write magnetic recording band writing count threshold value). For example, in the MPU 60 determines whether the number of times of writing (the number of times of forward direction adjacent track writing) that data is written to the adjacent track (forward direction adjacent track) adjacent to the target shingled write magnetic recording band region in the forward direction exceeds the writing count threshold value (adjacent track writing count threshold value) of the number of times of writing corresponding to the target shingled write magnetic recording band region or is equal to or less than the writing count threshold value (adjacent track writing count threshold value).

When it is determined that the number of times of writing data is written in the forward direction corresponding to the target band region is equal to or less than the writing count threshold value (NO in B803), the MPU 60 proceeds the process to B801. For example, when it is determined that the number of times of writing (the number of times of forward direction adjacent shingled write magnetic recording band writing) that data is written to the shingled write magnetic recording band region (forward direction adjacent shingled write magnetic recording band region) adjacent to the target shingled write magnetic recording band region in the forward direction is equal to or less than the writing count threshold value (adjacent shingled write magnetic recording band writing count threshold value) of the number of times of writing corresponding to this target shingled write magnetic recording band region, the MPU 60 proceeds the process to B801. For example, when it is determined that the number of times of writing (the number of times of forward direction adjacent track writing) that data is written to the adjacent track (forward direction adjacent track) adjacent to the target shingled write magnetic recording band region in the forward direction is equal to or less than the writing count threshold value (adjacent track writing count threshold value) of the number of times of writing corresponding to this target shingled write magnetic recording band region, the MPU 60 proceeds the process to B801.

When it is determined that the number of times of writing that data is written in the forward direction corresponding to the target band region has exceeded the writing count threshold value (YES in B803), the MPU 60 rewrites part (sector or track) of this target band region (B804), and ends the process. For example, when it is determined that the number of times of writing (the number of forward direction adjacent shingled write magnetic recording band writing) that data is written to the shingled write magnetic recording band region (forward direction adjacent shingled write magnetic recording band region) adjacent to the target shingled write magnetic recording band region in the forward direction exceeds the writing count threshold value (adjacent shingled write magnetic recording band writing count threshold value) of the number of times of writing corresponding to this target shingled write magnetic recording band region, the MPU 60 rewrites the last shingled write magnetic recording track in the target shingled write magnetic recording band region at the same position, and ends the process. For example, when it is determined that the number of times of writing (the number of times of forward direction adjacent track writing) that data is written to the adjacent track (forward direction adjacent track) adjacent to the target shingled write magnetic recording band region in the forward direction exceeds the writing count threshold value (adjacent track writing count threshold value) of the number of times of writing corresponding to this target shingled write magnetic recording band region, the MPU 60 rewrites the last shingled write magnetic recording track in the target shingled write magnetic recording band region at the same position, and ends the process.

When it is determined that the number of times of writing that data is written in the reverse direction corresponding to the target band region has exceeded the writing count threshold value (YES in B802), the MPU 60 offsets and rewrites part (sector or track) of this target band region (B805) and ends the process. For example, when it is determined that the number of times of writing (the number of times of reverse direction adjacent shingled write magnetic recording band writing) that data is written to the shingled write magnetic recording band region (reverse direction adjacent shingled write magnetic recording band region) adjacent to the target shingled write magnetic recording band region in the reverse direction exceeds the writing count threshold value (adjacent shingled write magnetic recording band writing count threshold value) of the number of times of writing corresponding to this target shingled write magnetic recording band region, the MPU 60 offsets and rewrites the last shingled write magnetic recording track in the target shingled write magnetic recording band region in the reverse direction, and ends the process. For example, when it is determined that the number of times of writing (the number of times of forward direction adjacent track writing) that data is written to the adjacent track (forward direction adjacent track) adjacent to the target shingled write magnetic recording band region in the reverse direction exceeds the writing count threshold value (adjacent track writing count threshold value) of the number of times of writing corresponding to this target shingled write magnetic recording band region, the MPU 60 rewrites the last shingled write magnetic recording track in the target shingled write magnetic recording band region at the same position, and ends the process.

According to the present embodiment, the magnetic disk device 1 counts the number of times of writing that data is written to an adjacent band or an adjacent track adjacent to the target shingled write magnetic recording band region in the radial direction. When it is determined that the number of times of writing that data is written to the shingled write magnetic recording band region adjacent to the target shingled write magnetic recording band region in the forward direction exceeds the writing count threshold value of the number of times of writing corresponding to this target shingled write magnetic recording band region, the magnetic disk device 1 rewrites the last shingled write magnetic recording track in the target shingled write magnetic recording band region at the same position. When it is determined that the number of times of writing that data is written to the shingled write magnetic recording band region adjacent to the target shingled write magnetic recording band region in the reverse direction exceeds the writing count threshold value of this number of times of writing corresponding to this target shingled write magnetic recording band region, the MPU 60 offsets the initial shingled write magnetic recording track in the target shingled write magnetic recording band region in the reverse direction to perform rewriting. Therefore, the magnetic disk device 1 can maintain the data quality by rewriting part of the particular band region. Further, the magnetic disk device 1 can reduce (or shorten) the time required for the rewrite process by making part of the particular band region rewritable, as compared with when rewriting the entire band region. Therefore, the magnetic disk device can improve the write/read processing performance.

In the first embodiment described above, description is made in which the magnetic disk device 1 performs a rewrite process of offsets at least one track according to the number of times of writing that data is written to the vicinity of the target band region to perform renewing or rewriting. The magnetic disk device 1 may perform a rewrite process of offsetting and renewing or rewriting the initial track in the target band region in response to a rewrite instruction from the user or the host 100 to renew or rewrite part or all of the initial track in the target band region. Further, the magnetic disk device 1 may perform a rewrite process of offsetting and renewing or rewriting a plurality of tracks that is continuously written in the forward direction from the initial track in the target band region to the track including this data or the track including the last part of this data in response to a rewrite instruction to renew or rewrite the data disposed in the middle of the target band region. In this way, the time required for the rewrite process can be reduced (or shortened) by performing a rewrite process of renewing or rewriting part or all of the initial track in the target band region, or data disposed in the middle of the target band region in response to an instruction from the user or the host 100, as compared with when using a rewrite process of renewing or rewriting the entire target band region. Therefore, the magnetic disk device 1 can improve the write/read processing performance.

Next, a magnetic disk device according to modifications and another embodiment will be described. In the modifications and another embodiment, the same reference numerals are attached to the same parts as those in the above first embodiment, and a detailed description thereof will be omitted.

(Modification 1)

The magnetic disk device 1 according to Modification 1 is different from the magnetic disk device 1 according to the first embodiment described above in the reading method.

When part of the band region is offset to perform rewriting, the read/write controller 610 offsets (shifts) part of the band region reading. For example, when the read/write controller 610 offsets the initial shingled write magnetic recording track in the target shingled write magnetic recording band region in the reverse direction to perform rewriting, the read/write controller 610 offsets the initial shingled write magnetic recording track in the target shingled write magnetic recording band region in the reverse direction and reads the rewrite to perform reading. In other words, when the read/write controller 610 offsets the initial shingled write magnetic recording track in the target shingled write magnetic recording band region in the reverse direction to perform rewriting, the read/write controller 610 performs positioning at a target position (hereinafter, also referred to as a rewrite read position) when performing reading after rewriting this initial shingled write magnetic recording track offset in the reverse direction from a target position (hereinafter, also referred to as an original read position) when performing reading before rewriting this initial shingled write magnetic recording track to read this initial shingled write magnetic recording track.

Figure 9:
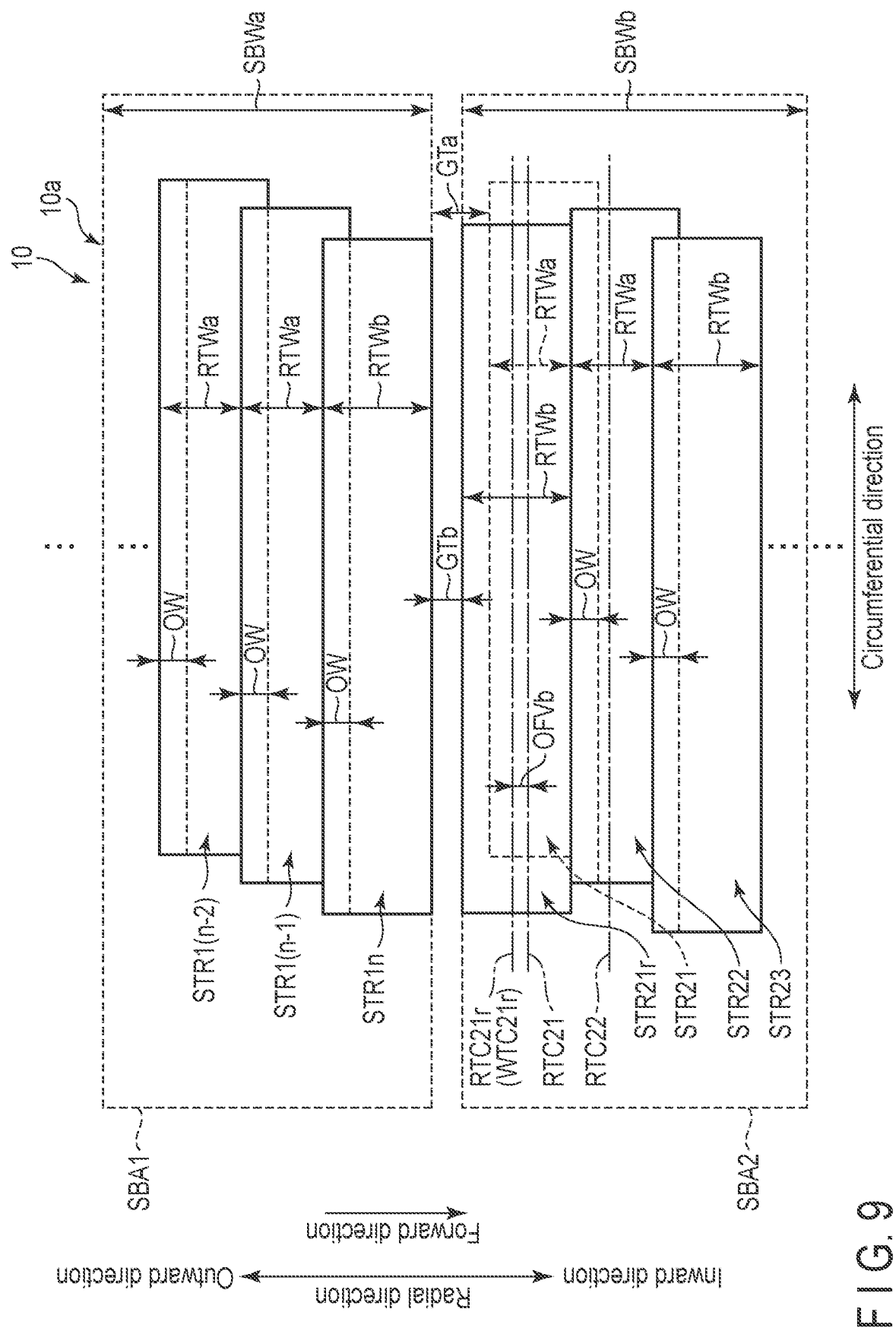
FIG. 9 is a schematic view showing an example of a read process according to Modification 1.

FIG. 9 is a schematic diagram showing an example of read process according to Modification 1. FIG. 9 corresponds to FIG. 7. FIG. 9 shows the read track center RTC21, of the track STR21, which corresponds to the target position when reading the track STR21, the read track center RTC21r, of the track STR21r, which corresponds to the target position when reading the track STR21r, and the read track center RTC22, of the track STR22, which corresponds to the target position when reading the track STR22. The read track center RTC21 corresponds to a path passing through the center position of the track width RTWa of the track STR21 which is not overwritten with the track STR22. In FIG. 9, the read track center RTC21 corresponds to the original read position corresponding to the track STR21r. The read track center RTC21r corresponds to the track center WTC21r and corresponds to a path passing through the center position of the track width RTWb of the track STR21r. In FIG. 9, the read track center RTC21r corresponds to the rewrite read position corresponding to the track TR21r. The read track center RTC21r is located away from the read track center RTC21 in the reverse direction by a shift amount OFVb. The read track center RTC22 corresponds to a path passing through the center position of the track width RTWa of the track STR22 which is not overwritten with the track STR23.

In the example shown in FIG. 9, the read/write controller 610 positions the head 15 (read head 15R) at the read track center RTC21r (WTC21r) and reads the track STR21r. The read/write controller 610 positions the head 15 (read head 15R) at the read track center RTC22 and reads the track STR22.

Figure 10:
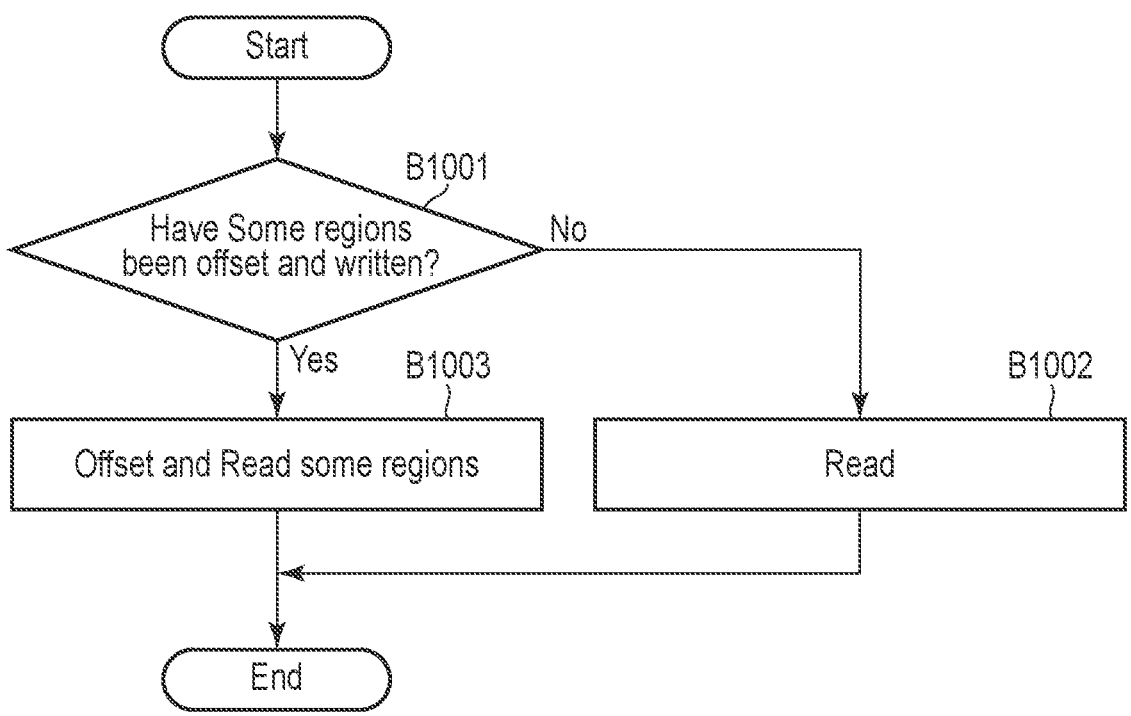
FIG. 10 is a flowchart showing an example of a read method according to Modification 1.

FIG. 10 is a flowchart showing an example of the read method according to Modification 1.

The MPU 60 determines whether part of the target band region has been offset and written or it has not been offset and written (B1001). For example, the MPU 60 determines whether the initial shingled write magnetic recording track in the target shingled write magnetic recording band region is offset and rewritten in the reverse direction or it is offset and not rewritten in the reverse direction.

When it is determined that part of the target band region has not been offset and written (NO of B1001), the MPU 60 reads part of the target band region at the original read position (B1002) and ends the process. For example, when it is determined that the initial shingled write magnetic recording track in the target shingled write magnetic recording band region is offset in the reverse direction and is not rewritten, the MPU 60 reads the initial shingled write magnetic recording track in the target shingled write magnetic recording band region at the original read position.

When it is determined that part of the target band region has been offset and written (YES in B1001), the MPU 60 offsets and reads part of the target band region (B1003) and ends the process. For example, when it is determined that the initial shingled write magnetic recording track in the target shingled write magnetic recording band region is offset in the reverse direction and is rewritten, the MPU 60 performs positioning at the rewrite read position offset in the reverse direction from the original read position to read the initial shingled write magnetic recording track in the target shingled write magnetic recording band region.

According to Modification 1, when the magnetic disk device 1 offsets and rewrites the initial shingled write magnetic recording track in the target shingled write magnetic recording band region in the reverse direction, the magnetic disk device 1 offsets the initial shingled write magnetic recording track in the target shingled write magnetic recording band region in the reverse direction to perform reading. Therefore, the magnetic disk device can improve the write/read process performance.

(Modification 2)

The magnetic disk device 1 according to Modification 2 is different from the magnetic disk device 1 according to the first embodiment described above in the rewrite processing method.

For example, when it is determined that the number of times of forward direction adjacent shingled write magnetic recording band writing has exceeded the adjacent shingled write magnetic recording band writing count threshold value corresponding to the target shingled write magnetic recording band region, the rewrite controller 630 rewrites some tracks that are continuously lined up in the reverse direction from the last shingled write magnetic recording track in the target shingled write magnetic recording band region at the same position.

For example, when it is determined that the number of times of reverse direction adjacent band writing has exceeded the adjacent shingled write magnetic recording band writing count threshold value corresponding to the target shingled write magnetic recording band region, the rewrite controller 630 shifts (offsets) some tracks that are continuously shingled-write-magnetic-recorded in the forward direction from the initial shingled write magnetic recording track in this target shingled write magnetic recording band region in the reverse direction to perform rewriting. In other words, when it is determined that the number of times of reverse direction adjacent band writing has exceeded the number of times of adjacent shingled write magnetic recording band writing corresponding to the target shingled write magnetic recording band region, the rewrite controller 630 positions some tracks that are continuously shingled-write-magnetic-recorded in the forward direction from the initial shingled write magnetic recording track in this target shingled write magnetic recording band region at respective rewrite positions corresponding to these tracks and rewrites these tracks. For example, when it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 shifts (offsets) some tracks that are continuously shingled-write-magnetic-recorded from this initial shingled write magnetic recording track in the forward direction from the respective original positions corresponding to these tracks in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 may shift (offsets) some tracks that are continuously shingled-write-magnetic-recorded in the forward direction from the initial shingled write magnetic recording track in this target shingled write magnetic recording band region in the reverse direction from the respective original positions corresponding to these tracks by the overlapping range (hereinafter, may be referred to as an initial overlapping range) or more between the initial shingled write magnetic recording track in this target shingled write magnetic recording band region and a track with which this initial shingled write magnetic recording track is overwritten, and the sum or less of the initial overlapping range of the target shingled write magnetic recording band region and the guard track to perform rewriting. When it is determined that the number of times of reverse direction adjacent shingled write magnetic recording band writing has exceeded the adjacent shingled write magnetic recording band writing count threshold value corresponding to the target shingled write magnetic recording band region, the rewrite controller 630 may shift (offsets) some tracks that are continuously shingled-write-magnetic-recorded in the forward direction from the initial shingled write magnetic recording track in this target shingled write magnetic recording band region in the reverse direction from the respective original positions corresponding to these tracks by the initial overlapping range or more of the target shingled write magnetic recording band region, and the sum or less of the initial overlapping range of the target shingled write magnetic recording band region, the guard track, and the last overlapping range of the shingled write magnetic recording band region adjacent to the target shingled write magnetic recording band region in the reverse direction to perform rewriting.

For example, when it is determined that the number of times of forward direction proximity track writing has exceeded the proximity track writing count threshold value corresponding to the target shingled write magnetic recording band region, the rewrite controller 630 rewrites some tracks that are continuously lined up in the reverse direction from the last shingled write magnetic recording track in the target shingled write magnetic recording band region at the same position.

For example, when it is determined that the number of times of reverse direction proximity track writing has exceeded the proximity track writing count threshold value corresponding to the target shingled write magnetic recording band region, the rewrite controller 630 shifts (offsets) some tracks that are continuously shingled-write-magnetic-recorded in the forward direction from the initial shingled write magnetic recording track in this target shingled write magnetic recording band region in the reverse direction to perform rewriting. In other words, when it is determined that the number of times of reverse direction proximity track writing has exceeded the proximity track writing count threshold value corresponding to the target shingled write magnetic recording band region, the rewrite controller 630 positions some tracks that are continuously shingled-write-magnetic-recorded in the forward direction from the initial shingled write magnetic recording track in this target shingled write magnetic recording band region at respective rewrite positions corresponding to these tracks to rewrite these tracks. For example, when it is determined that the number of times of reverse direction proximity track writing has exceeded the proximity track writing count threshold value corresponding to the target shingled write magnetic recording band region, the rewrite controller 630 shifts (offsets) some tracks that are continuously shingled-write-magnetic-recorded from this initial shingled write magnetic recording track in the forward direction from the respective original positions corresponding to these tracks in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction proximity track writing has exceeded the proximity track writing count threshold value corresponding to the target shingled write magnetic recording band region, the rewrite controller 630 may shift (offset) some tracks that are continuously shingled-write-magnetic-recorded in the forward direction from the initial shingled write magnetic recording track in this target shingled write magnetic recording band region from respective original positions corresponding to these tracks in the reverse direction by the initial overlapping range or more of the target shingled write magnetic recording band region and the sum or less of the initial overlapping range of the target shingled write magnetic recording band region and the guard track to perform rewriting. When it is determined that the number of times of reverse direction proximity track writing has exceeded the proximity track writing count threshold value corresponding to the target shingled write magnetic recording band region, the rewrite controller 630 may shift (offsets) some tracks that are continuously shingled-write-magnetic-recorded in the forward direction from the initial shingled write magnetic recording track in this target shingled write magnetic recording band region from the respective original positions corresponding to these tracks in the reverse direction by the initial overlapping range or more of the target shingled write magnetic recording band region, and the sum or less of the initial overlapping range of the target shingled write magnetic recording band region, the guard track, and the last overlapping range of the shingled write magnetic recording band region adjacent to the target shingled write magnetic recording band region in the reverse direction to perform rewriting.

For example, when it is determined that the number of times of forward direction adjacent track writing has exceeded the adjacent track writing count threshold value corresponding to the target shingled write magnetic recording band region, the rewrite controller 630 rewrites some tracks that are continuously lined up in the reverse direction from the last shingled write magnetic recording track in the target shingled write magnetic recording band region at the same position.

For example, when it is determined that the number of times of reverse direction adjacent track writing has exceeded the adjacent track writing count threshold value corresponding to the target shingled write magnetic recording band region, the rewrite controller 630 shifts (offsets) some tracks that are continuously shingled-write-magnetic-recorded in the forward direction from the initial shingled write magnetic recording track in this target shingled write magnetic recording band region in the reverse direction to perform rewriting. In other words, when it is determined that the number of times of reverse direction adjacent track writing has exceeded the adjacent track writing count threshold value corresponding to the target shingled write magnetic recording band region, the rewrite controller 630 positions some tracks that are continuously shingled-write-magnetic-recorded in the forward direction from the initial shingled write magnetic recording track in this target shingled write magnetic recording band region at respective rewrite positions corresponding to these tracks to rewrite these tracks. For example, when it is determined that the number of times of reverse direction adjacent track writing has exceeded the adjacent track writing count threshold value corresponding to the target shingled write magnetic recording band region, the rewrite controller 630 shifts (offsets) some tracks that are continuously shingled-write-magnetic-recorded from this initial shingled write magnetic recording track in the forward direction from the respective original positions corresponding to these tracks in the reverse direction by the radial length or more of the overlapping range between the initial shingled write magnetic recording track in this target shingled write magnetic recording band region and a track with which this initial shingled write magnetic recording track is overwritten, and the guard track or less to perform rewriting. When it is determined that the number of times of reverse direction adjacent track writing has exceeded the adjacent track writing count threshold value corresponding to the target shingled write magnetic recording band region, the rewrite controller 630 may shift (offset) some tracks that are continuously shingled-write-magnetic-recorded in the forward direction from the initial shingled write magnetic recording track in this target shingled write magnetic recording band region from respective original positions corresponding to these tracks in the reverse direction by the initial overlapping range or more of the target shingled write magnetic recording band region and the sum or less of the initial overlapping range of the target shingled write magnetic recording band region and the guard track to perform rewriting. When it is determined that the number of times of reverse direction adjacent track writing has exceeded the adjacent track writing count threshold value corresponding to the target shingled write magnetic recording band region, the rewrite controller 630 may shift (offsets) some tracks that are continuously shingled-write-magnetic-recorded in the forward direction from the initial shingled write magnetic recording track in this target shingled write magnetic recording band region from the respective original positions corresponding to these tracks in the reverse direction by the initial overlapping range or more of the target shingled write magnetic recording band region, and the sum or less of the initial overlapping range of the target shingled write magnetic recording band region, the guard track, and the last overlapping range of the shingled write magnetic recording band region adjacent to the target shingled write magnetic recording band region in the reverse direction to perform rewriting.

When rewriting some tracks that are continuously shingled-write-magnetic-recorded in the forward direction from the initial shingled write magnetic recording track in this target shingled write magnetic recording band region, the rewrite controller 630 may performing rewriting so that the track width of these tracks is twice or less the track pitch.

Figure 11:
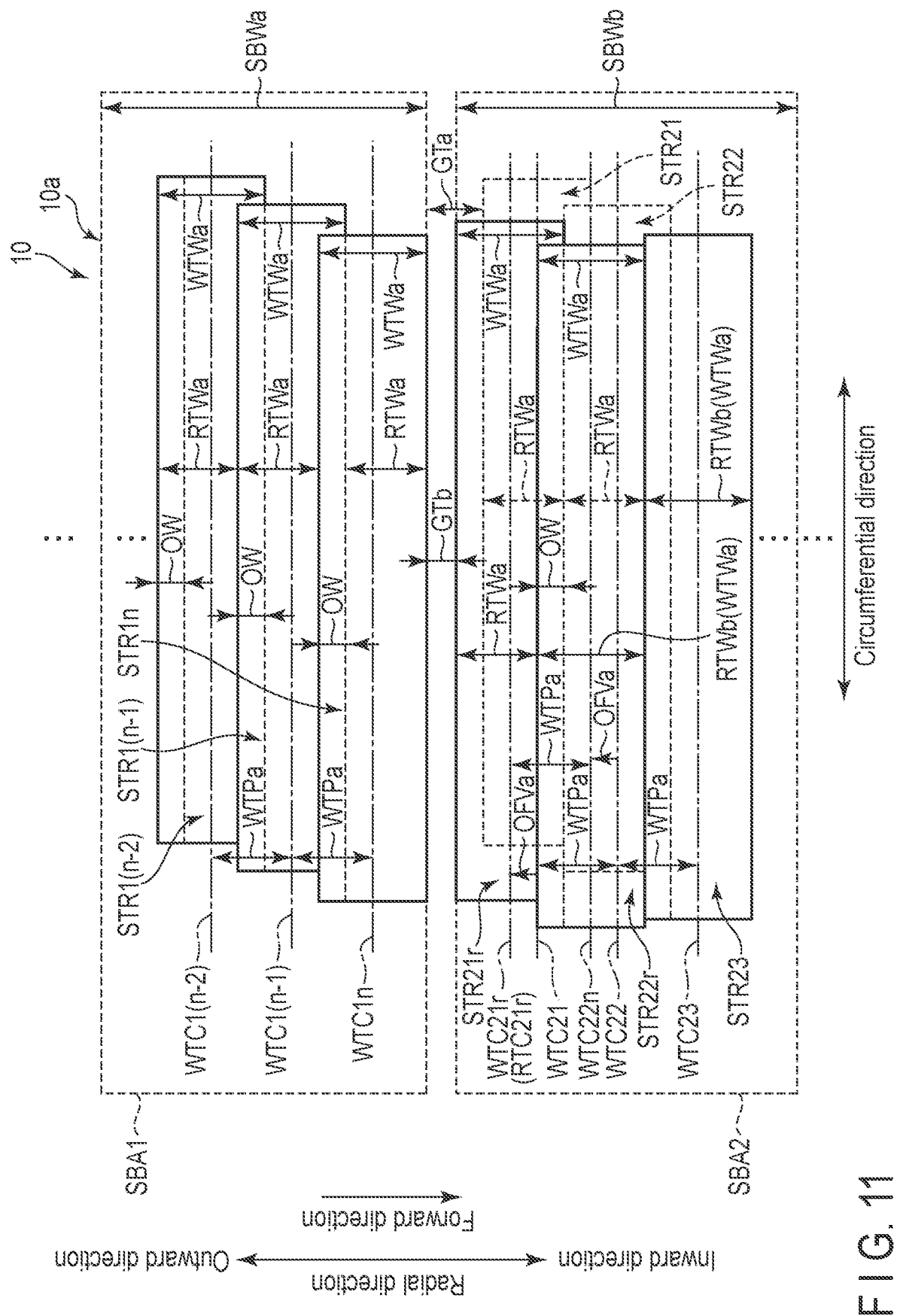
FIG. 11 is a schematic diagram showing an example of a rewrite process according to Modification 2.

FIG. 11 is a schematic diagram showing an example of the rewrite process according to Modification 2. FIG. 11 corresponds to FIGS. 6 and 7. FIG. 11 shows the track STR22$r$ which rewrites the track STR22 in the shingled write magnetic recording band region SBA2. The data written to the track STR22$r$ corresponds to the data written to the track STR22. The track center WTC22$r$ of the track STR22$r$ corresponds to a radial position shifted (offset) in the reverse direction from the track center WTC22 of the track STR22 by, for example, the shift amount (or offset amount) OFVa toward the shingled write magnetic recording band region SBA2. In other words, the track STR22r is disposed by shifting the track STR22 by the shift amount OFVa in the reverse direction. The track STR22r is disposed by shifting the track STR22 by the shift amount different from the shift amount OFVa in the reverse direction. The track width RTWb of the track STR22r is larger than the track width RTWa of the track STR22 overwritten with the track STR23. In the example shown in FIG. 11, the track width RTWb of the track STR22r is larger than the track width RTWa of the track STR22 by the overlapping range OW between the tracks STR22 and STR23.

When it is determined that the number of times of writing (the number of times of reverse direction adjacent shingled write magnetic recording band writing) that data is written to the shingled write magnetic recording band region SBA1 has exceeded the writing count threshold value (adjacent shingled write magnetic recording band writing count threshold value) corresponding to the shingled write magnetic recording band region SBA2, the MPU 60 shifts the initial shingled write magnetic recording tracks STR21 and STR22 of the shingled write magnetic recording band region SBA2 in the reverse direction by, for example, the shift amount OFVa toward the shingled write magnetic recording band region SBA1 to rewrite the initial shingled write magnetic recording tracks STR21r and STR22r by the shingled write magnetic recording type.

When it is determined that the number of times of writing (the number of times of reverse direction proximity track writing) that at least one track of . . . , and the track STR1(n−2) to the track STR1n in the shingled write magnetic recording band region SBA2 is written exceeds the writing count threshold value (proximity track writing count threshold value) corresponding to the shingled write magnetic recording band region SBA2, the MPU 60 shifts the initial shingled write magnetic recording tracks STR21 and STR22 of the shingled write magnetic recording band region SBA2 in the reverse direction by, for example, the shift amount OFVa toward the shingled write magnetic recording band region SBA1 to rewrite the initial shingled write magnetic recording tracks STR21r and STR22r by the shingled write magnetic recording type.

When it is determined that the number of times of writing (the number of times of reverse direction adjacent track writing) that the track STR1n in the shingled write magnetic recording band region SBA1 is written exceeds the writing count threshold value (adjacent track writing count threshold value) corresponding to the shingled write magnetic recording band region SBA2, the MPU 60 shifts the initial shingled write magnetic recording tracks STR21 and STR22 of the shingled write magnetic recording band region SBA2 in the reverse direction by, for example, the shift amount OFVa toward the shingled write magnetic recording band region SBA1 to rewrite the initial shingled write magnetic recording tracks STR21r and STR22r by the shingled write magnetic recording type.

According to Modification 2, the magnetic disk device 1 counts the number of times of writing that data is written to an adjacent band or an adjacent track adjacent to the target shingled write magnetic recording band region in the radial direction. When it is determined that the number of times of writing that data is written to the shingled write magnetic recording band region adjacent to the target shingled write magnetic recording band region in the forward direction exceeds the writing count threshold value (adjacent shingled write magnetic recording band writing count threshold value) of the number of times of writing corresponding to this target shingled write magnetic recording band region, the magnetic disk device 1 rewrites some tracks that are continuously lined up in the reverse direction from the last shingled write magnetic recording track in the target shingled write magnetic recording band region at the same position. When it is determined that the number of times of writing that data is written to the shingled write magnetic recording band region adjacent to the target shingled write magnetic recording band region in the reverse direction exceeds the writing count threshold value (adjacent shingled write magnetic recording band writing count threshold value) of the number of times of writing corresponding to this target shingled write magnetic recording band region, the MPU 60 offsets some tracks that are continuously shingled-write-magnetic-recorded in the forward direction from the initial shingled write magnetic recording track in this target shingled write magnetic recording band region in the reverse direction to perform rewriting. Therefore, the magnetic disk device can improve the write/read process performance.

(Modification 3)

The magnetic disk device 1 according to Modification 3 is different from the magnetic disk device 1 according to the first embodiment, Modification 1, and Modification 2 described above in the reading method.

For example, when the read/write controller 610 offsets and rewrites some tracks that are continuously shingled-write-magnetic-recorded in the forward direction from the initial shingled write magnetic recording track in the target shingled write magnetic recording band region in the reverse direction, the read/write controller 610 offsets some tracks that are continuously shingled-write-magnetic-recorded in the forward direction from the initial shingled write magnetic recording track in this target shingled write magnetic recording band region in the reverse direction to perform reading. In other words, when the read/write controller 610 offsets and rewrites some tracks that are continuously shingled-write-magnetic-recorded in the forward direction from the initial shingled write magnetic recording track in the target shingled write magnetic recording band region in the reverse direction, the read/write controller 610 performs positioning at respective rewrite read positions corresponding to these tracks which are offset in the reverse direction from the respective original read positions corresponding to these tracks to read these tracks.

Figure 12:
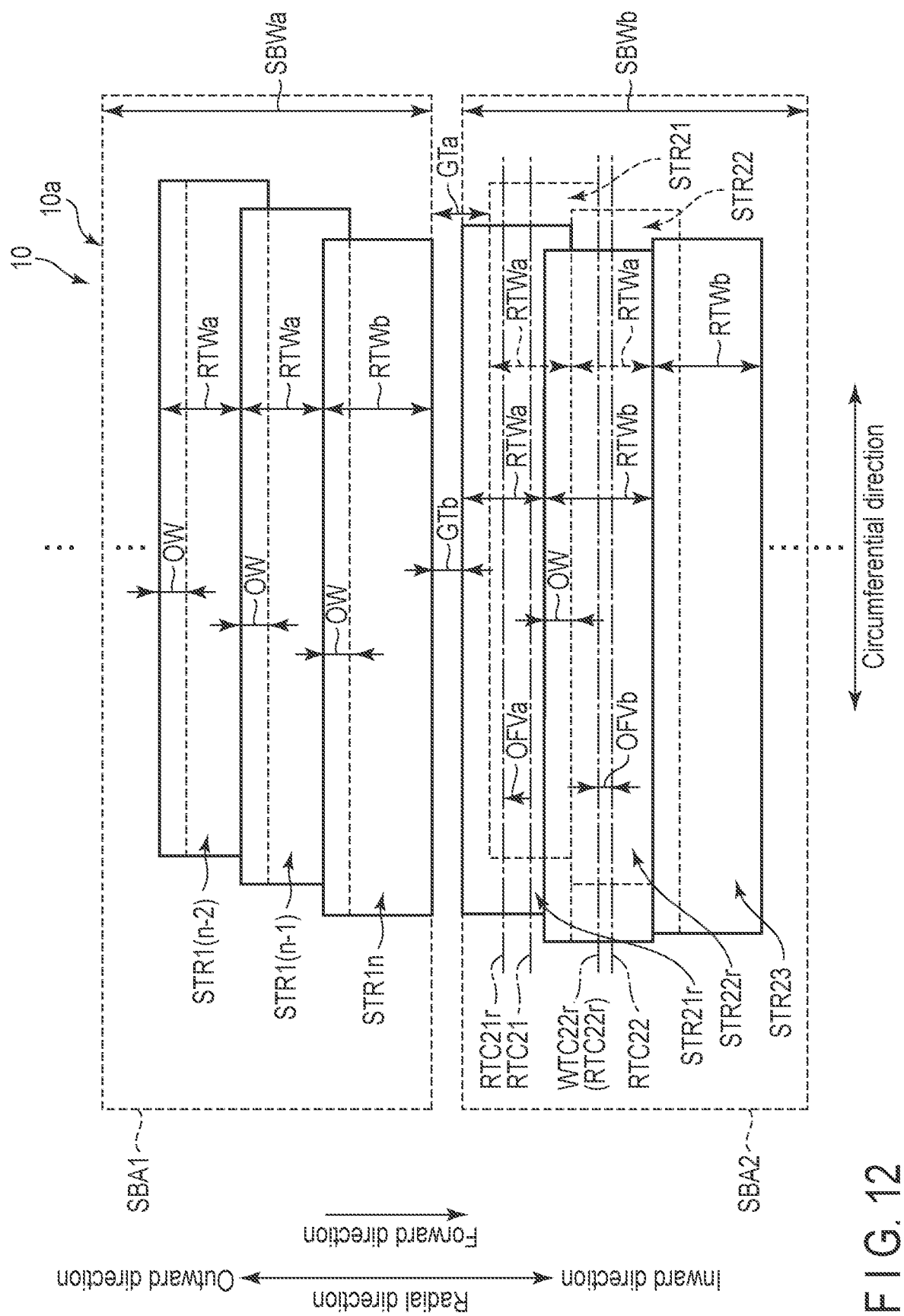
FIG. 12 is a schematic view showing an example of a read process according to Modification 3.

FIG. 12 is a schematic view showing an example of the read process according to Modification 3. FIG. 12 corresponds to FIGS. 9 and 11. FIG. 12 shows the read track center RTC21, of the track STR21, which corresponds to the target position when reading the track STR21, the read track center RTC21r, of the track STR21r, which corresponds to the target position when reading the track STR21r, the read track center RTC22, of the track STR22, which corresponds to the target position when reading the track STR22, and the read track center RTC22r, of the track STR22r, which corresponds to the target position when reading the track STR22r. The read track center RTC21 corresponds to a path passing through the center position of the track width RTWa of the track STR21 which is not overwritten with the track STR22. In FIG. 12, the read track center RTC21 corresponds to the original read position corresponding to the track STR21r. The read track center RTC21r corresponds to a path passing through the center position of the track width RTWa of the track STR21r to which the track STR22r is not overwritten. In FIG. 12, the read track center RTC21r corresponds to the rewrite read position corresponding to the track STR21r. The read track center RTC21r is located away from the read track center RTC21 in the reverse direction by a shift amount OFVa. The read track center RTC21r may be located away from the read track center RTC21 in the reverse direction by a shift amount other than the shift amount OFVa. The read track center RTC22 corresponds to a path passing through the center position of the track width RTWa of the track STR22 which is not overwritten with the track STR23. In FIG. 12, the read track center RTC22 corresponds to the original read position corresponding to the track STR22r. The read track center RTC22r corresponds to the track center WTC22r and corresponds to a path passing through the center position of the track width RTWb of the track STR22r. In FIG. 12, the read track center RTC22r corresponds to the rewrite read position corresponding to the track STR22r.

In the example shown in FIG. 12, the read/write controller 610 positions the head 15 (read head 15R) at the read track center RTC21r (WTC21r) and reads the track STR21r. The read/write controller 610 positions the head 15 (read head 15R) at the read track center RTC22 and reads the track STR22. The read track center RTC22r is located away from the read track center RTC22 in the reverse direction by the shift amount OFVb.

In the example shown in FIG. 12, the read/write controller 610 positions the head 15 (read head 15R) at the read track center RTC21r and reads the track STR21r. The read/write controller 610 positions the head 15 (read head 15R) at the read track center RTC22r and reads the track STR22r.

According to Modification 3, when the magnetic disk device 1 offsets and rewrites some tracks that are continuously shingled-write-magnetic-recorded in the forward direction from the initial shingled write magnetic recording track in the target shingled write magnetic recording band region in the reverse direction, the magnetic disk device 1 offsets some tracks that are continuously shingled-write-magnetic-recorded in the forward direction from the initial shingled write magnetic recording track in this target shingled write magnetic recording band region and read in the reverse direction to perform reading. Therefore, the magnetic disk device can improve the write/read process performance.

Second Embodiment

The magnetic disk device 1 according to the second embodiment is different from the magnetic disk device 1 according to the first embodiment, Modification 1, Modification 2, and Modification 3 described above in that it is a magnetic disk device that can be performed by selecting a conventional magnetic recording type and a shingled write magnetic recording type.

The MPU 60 selects and executes the conventional magnetic recording process and the shingled write magnetic recording process according to a command or the like from the host 100. The MPU 60 may execute only the conventional magnetic recording process or only the shingled write magnetic recording process. The MPU 60 conventional-magnetic-records data randomly or sequentially in a particular band region. Hereinafter, the "band region including at least one track written by conventional magnetic recording" is referred to as a "conventional magnetic recording band region". The MPU 60 conventional-magnetic-records data in a conventional magnetic recording band region and shingled-write-magnetic-records data in a shingled write magnetic recording band region. The MPU 60 may shingled-write-magnetic-record data in part of the conventional magnetic recording band region, or may conventional-magnetic-record data in part of the shingled write magnetic recording band region.

Figure 13:
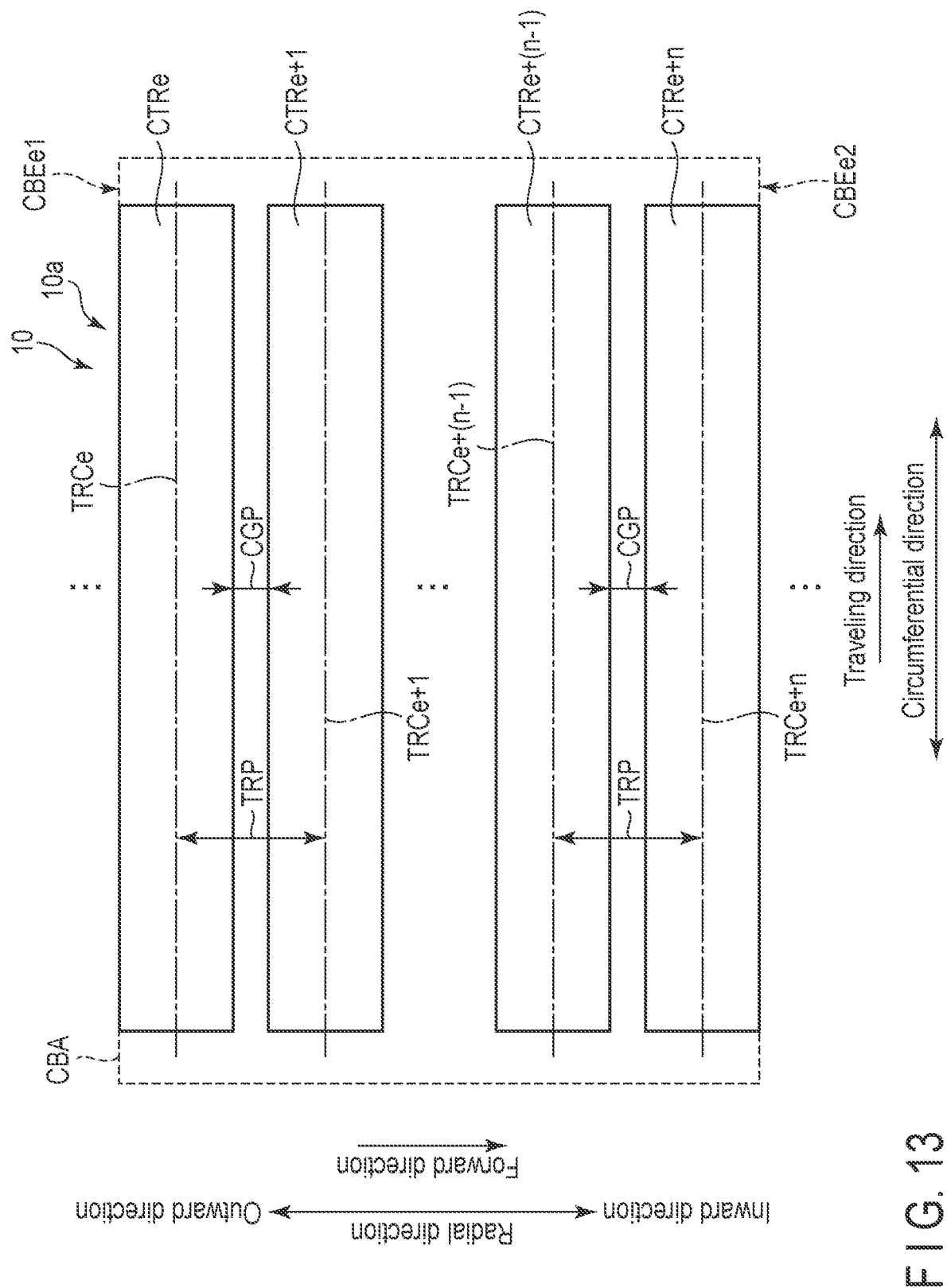
FIG. 13 is a schematic diagram showing an example of a conventional magnetic recording process.

FIG. 13 is a schematic diagram showing an example of the conventional magnetic recording process. As shown in FIG. 13, a conventional magnetic recording band region CBA is shown. In the example shown in FIG. 13, the conventional magnetic recording band region CBA includes the track CTRe, the track CTRe+1, . . . , the track CTRe+(n−1), and the track CTRe+n. Hereinafter, in the conventional magnetic recording band region, the track located at the extreme end in the reverse direction may be referred to as an initial conventional magnetic recording track, and the track located at the extreme end in the forward direction may be referred to as a last conventional magnetic recording track. Further, the initial conventional magnetic recording track and the initial shingled write magnetic recording track may be collectively referred to as an initial track, and the last conventional magnetic recording track and the last shingled write magnetic recording track may be collectively referred to as a last track. FIG. 13 shows the track center TRCe of the track CTRe, the track center TRCe+1 of the track CTRe+1, . . . , the track center TRCe+(n−1) of the track CTRe+(n−1), and the track CTRe+n of the track center TRCe+n. In FIG. 13, the track CTRe is located at the extreme end CBEe1 of the conventional magnetic recording band region CBA in the reverse direction. That is, in FIG. 13, the track CTRe initially corresponds to the initial conventional magnetic recording track. In FIG. 13, the track CTRe+n is located at the extreme end CBEe2 of the conventional magnetic recording band region CBA in the forward direction. That is, in FIG. 13, the track CTRe+n corresponds to the last conventional magnetic recording track. The tracks CTRe to CTRe+n are each disposed in the radial direction with a track pitch TRP. The track center TRCe of the track CTRe and the track center TRCe+1 of the track CTRe+1 are away by the track pitch TRP in the radial direction. Further, the track center TRCe+(n−1) of the track CTRe+(n−1) and the track center TRCe+n of the track CTRe+n are away by the track pitch TRP in the radial direction. The tracks CTRe to CTRe+n may be disposed at different track pitches in the radial direction. Further, the tracks CTRe to CTRe+n are each disposed with a gap CGP in the radial direction. The track CTRe and the track CTRe+1 are away with the gap CGP, and the track CTRe+(n−1) and the track CTRe+n are away with the gap CGP. The tracks CTRe to CTRe+n may be disposed with different gaps. In FIG. 13, for convenience of explanation, each track is shown in a rectangular shape extending in the circumferential direction with a particular track width, but practically, it is curved along the circumferential direction. Further, each track may have a wavy shape extending in the circumferential direction while fluctuating in the radial direction.

In the example shown in FIG. 13, the MPU 60 conventional-magnetic-records the track CTRe by positioning the head 15 at the track center TRCe in the conventional magnetic recording band region CBA of the user data region 10a. The MPU 60 conventional-magnetic-records the track CTRe+1 by positioning the head 15 at the track center TRCe+1 which is inwardly away from the track center TRCe of the track CTRe with the track pitch TRP in the conventional magnetic recording band region CBA. The MPU 60 conventional-magnetic-records the track CTRe+n by positioning the heads 15 at the track center TRCe+n which is away inward from the track center TRCe+(n−1) of the track CTRe+(n−1) with the track pitch TRP in the conventional magnetic recording band region CBA of the user data region 10a. The MPU 60 may sequentially conventional-magnetic-records the tracks CTRe, CTRe+1, ..., CTRe+(n−1), and CTRe+n in the conventional magnetic recording band region CBA of the user data region 10a, or may randomly conventional-magnetic-record them in respective particular sectors of the tracks CTRe, CTRe+1, ..., CTRe+(n−1), and CTRe+n.

Figure 14:
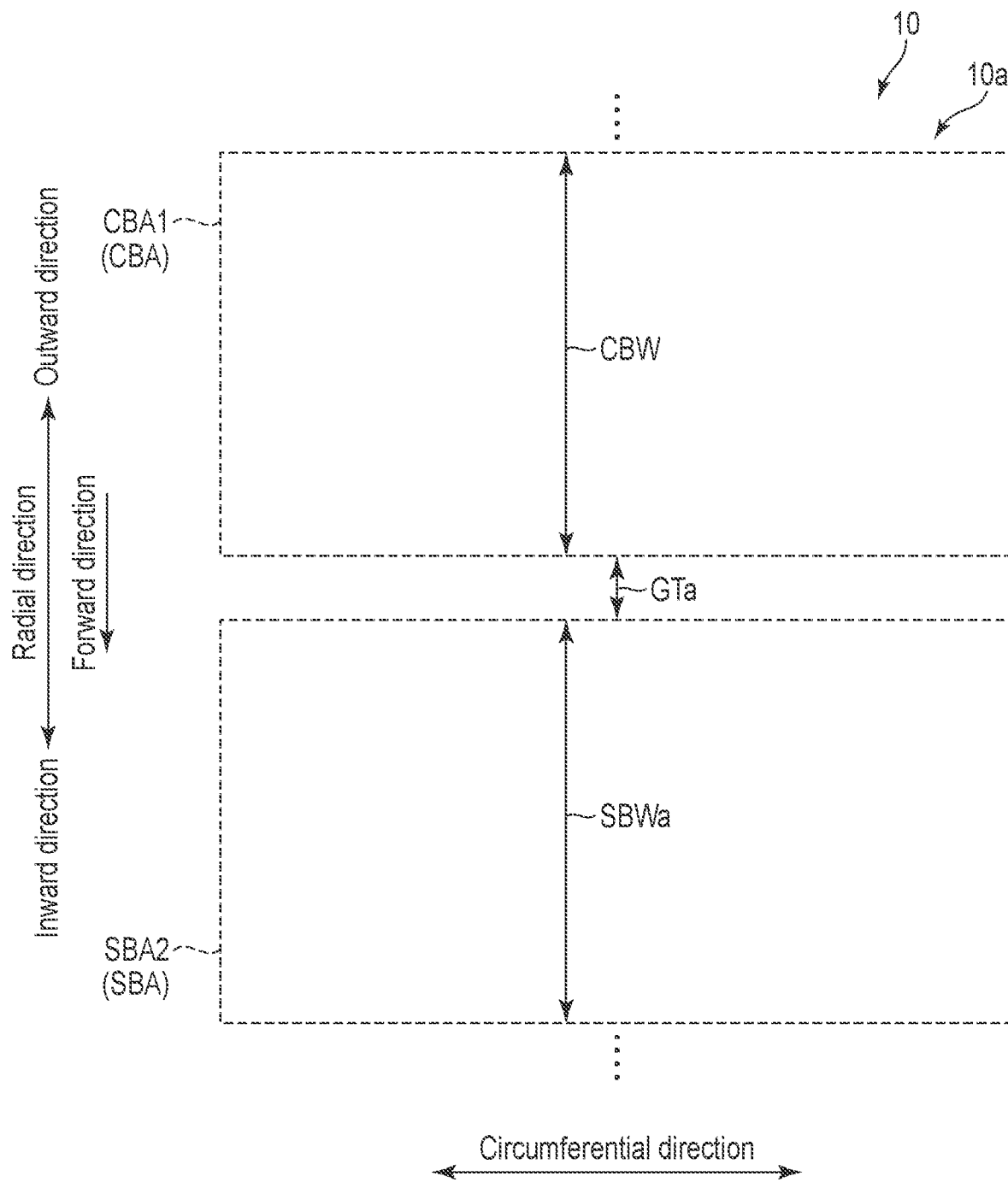
FIG. 14 is a schematic view showing an example of the arrangement of a conventional magnetic recording band region and a shingled write magnetic recording band region.

FIG. 14 is a schematic diagram showing an example of the arrangement of the conventional magnetic recording band region CBA1 and the shingled write magnetic recording band region SBA2. FIG. 14 shows the conventional magnetic recording band region CBA (CBA1) and the shingled write magnetic recording band region SBA (SBA2) that are adjacent to each other in the radial direction. FIG. 14 shows the radial width (hereinafter, may be referred to as a conventional magnetic recording bandwidth) CBW of the conventional magnetic recording band region CBA1. The conventional magnetic recording bandwidth CBW may be the same as the shingled write magnetic recording bandwidth SBWa. In other words, the area of the conventional magnetic recording band region CBA1 and the area of the shingled write magnetic recording band region SBA2 may be the same. The conventional magnetic recording bandwidth CBW may be different from the shingled write magnetic recording bandwidth SBWa. In other words, the area of the conventional magnetic recording band region CBA1 and the area of the shingled write magnetic recording band region SBA2 may be different. The conventional magnetic recording band region and the shingled write magnetic recording band region, which are adjacent to each other in the radial direction, are disposed with a guard track placed therebetween. In FIG. 14, the conventional magnetic recording band region CBA1 and the shingled write magnetic recording band region SBA2 are disposed with the guard track (or may be referred to as a guard gap) GTa placed therebetween. In FIG. 14, for convenience of explanation, the conventional magnetic recording band region CBA (CBA1) and the shingled write magnetic recording band region SBA (SBA2) are shown in a rectangular shape extending in the circumferential direction, but practically, they are curved along the circumferential direction.

The MPU 60 sequentially or randomly writes a plurality of tracks to the conventional magnetic recording band region CBA1 in the user data region 10a according to a command of the host 100 or the like. The MPU 60 sequentially writes a plurality of tracks to the shingled write magnetic recording band region SBA2 which is radially away from the conventional magnetic recording band region CBA1 with the guard gap GTa in the user data region 10a according to a command of the host 100 or the like.

The MPU 60 (write counter 620) counts the number of times of writing (hereinafter, may be referred to as the number of times of adjacent conventional magnetic recording band writing) that data is written to the conventional magnetic recording band region (hereinafter, also referred to as an adjacent conventional magnetic recording band region) adjacent to the target shingled write magnetic recording band region in the radial direction. The MPU 60 counts the number of times of adjacent conventional magnetic recording band writing (hereinafter, may be referred to as the number of times of forward direction adjacent conventional magnetic recording band writing) that data is written to the adjacent conventional magnetic recording band region (hereinafter, also referred to as a forward direction adjacent conventional magnetic recording band region) adjacent to the target conventional magnetic recording band region in the forward direction. The MPU 60 counts the number of times of adjacent conventional magnetic recording band writing (hereinafter, may be referred to as the number of times of reverse direction adjacent conventional magnetic recording band writing) that data is written to the adjacent conventional magnetic recording band region (hereinafter, also referred to as a reverse direction adjacent conventional magnetic recording band region) adjacent to the target conventional magnetic recording band region in the reverse direction.

The MPU 60 (write counter 620) increases (increments) the number of times of adjacent conventional magnetic recording band writing by a particular value when data is written to the adjacent conventional magnetic recording band region adjacent to the target conventional magnetic recording band region in the radial direction. For example, the MPU 60 increases (increments) the number of times of adjacent conventional magnetic recording band writing by one when data is written to the adjacent conventional magnetic recording band region adjacent to the target conventional magnetic recording band region in the radial direction. When data is written to the forward direction adjacent conventional magnetic recording band region, the MPU 60 increases (increments) the number of times of forward direction adjacent conventional magnetic recording band writing by a particular value. For example, the MPU 60 increments the number of times of forward direction adjacent conventional magnetic recording band writing by one when data is written to the forward direction adjacent conventional magnetic recording band region. When data is written to the reverse direction adjacent conventional magnetic recording band region, the MPU 60 increases (increments) the number of times of reverse direction adjacent conventional magnetic recording band writing by a particular value. For example, the MPU 60 increases (increments) the number of times of reverse direction adjacent conventional magnetic recording band writing by one when data is written to the reverse direction adjacent conventional magnetic recording band region.

FIG. 15 is a schematic diagram showing an example of a table TB2 of the number of times of writing. The table TB2 shown in FIG. 15 includes a band region, a track, and the number of times of writing. The band region of table TB2 in FIG. 15 includes a conventional magnetic recording band region CBA1 and a shingled write magnetic recording band region SBA2. The conventional magnetic recording band region CBA1 and the shingled write magnetic recording band region SBA2 shown in FIG. 15 are disposed adjacent to each other in the radial direction as shown in FIG. 14. For example, the shingled write magnetic recording band region SBA2 is adjacent to the conventional magnetic recording band region CBA1 in the forward direction as shown in FIG. 14. The tracks in table TB2 of FIG. 15 include the tracks CTR11, ..., CTR1(n−1), and CTR1n corresponding to the conventional magnetic recording band region CBA1. In FIG. 15, the track CTR11 corresponds to the initial conventional magnetic recording track of the conventional magnetic recording band region CBA1, and the track CTR1n corresponds to the last conventional magnetic recording track of the conventional magnetic recording band region CBA1.

The number of times of writing of the table TB2 in FIG. 15 includes the number of times of reverse direction adjacent track writing CTO11 and the number of times of forward direction adjacent track writing CTI11 corresponding to the track CTR11 in the conventional magnetic recording band region CBA1, ..., the number of times of reverse direction adjacent track writing CTO1(n−1) and the number of times of forward direction adjacent track writing CTI1($n-1$) corresponding to the track CTR1($n-1$) in the conventional magnetic recording band region CBA1, and the number of times of reverse direction adjacent track writing CTO1$n$ and the number of times of forward direction adjacent track writing CTI1$n$ corresponding to the track CTR1$n$ in the conventional magnetic recording band region CBA1. As the number of times of writing corresponding to the conventional magnetic recording band region CBA1, only the number of times of reverse direction adjacent track writing CTO11, ..., CTO1($n-1$), and CTO1$n$ may be held in the table TB2. The number of times of reverse direction adjacent track writing CTO11 corresponding to the track CTR11 corresponds to the number of times of writing that data is written to the last track in the band region adjacent to the conventional magnetic recording band region CBA1 in the reverse direction. The number of times of forward direction adjacent track writing CT111 corresponding to the track CTR11 corresponds to the number of times of writing that data is written to the adjacent track adjacent to the track CTR11 in the forward direction in the conventional magnetic recording band region CBA1. The number of times of reverse direction adjacent track writing CTO1($n-1$) corresponding to the track CTR1($n-1$) corresponds to the number of times of writing that data is written to the adjacent track adjacent to the track CTR1($n-1$) in the reverse direction in the conventional magnetic recording band region CBA1. The number of times of forward direction adjacent track writing CT11($n-1$) corresponding to the track CTR1($n-1$) corresponds to the number of times of writing that data is written to the track CTR1$n$. The number of times of number of times of reverse direction adjacent track writing CTO1$n$ corresponding to the track CTR1$n$ corresponds to the number of times of writing that data is written to the track CTR1($n-1$). The number of times of forward direction adjacent track writing CTI1$n$ corresponding to the track CTR1$n$ corresponds to the number of times of writing that data is written to the initial track, in the band region, adjacent to the conventional magnetic recording band region CBA1 in the forward direction.

The number of times of writing of the table TB2 in FIG. 15 includes the number of times of reverse direction adjacent track writing STO and the number of times of forward direction adjacent track writing STI corresponding to the shingled write magnetic recording band region SBA2. As the number of times of writing corresponding to the shingled write magnetic recording band region SBA2, only the number of times of reverse direction adjacent track writing STO may be held in the table TB2. The number of times of reverse direction adjacent track writing STO corresponding to the shingled write magnetic recording band region SBA2 corresponds to the number of times of writing that data is written to the last conventional magnetic recording track CTR1$n$ in the conventional magnetic recording band region CBA1. The number of times of forward direction adjacent track writing STI corresponding to the shingled write magnetic recording band region SBA2 corresponds to the number of times of writing that data is written to the initial track, in the band region, adjacent to the shingled write magnetic recording band region SBA2 in the forward direction. Further, the number of times of writing of the table TB2 in FIG. 15 may include the number of times of reverse direction proximity track writing and the number of times of forward direction proximity track writing corresponding to the shingled write magnetic recording band region SBA2. The number of times of reverse direction proximity track writing corresponding to the shingled write magnetic recording band region SBA2 corresponds to, for example, the number of times of writing that data is written to the tracks CTR1($n-1$) and CTR1$n$ in the conventional magnetic recording band region CBA1. The number of times of forward direction proximity track writing corresponding to the shingled write magnetic recording band region SBA2 corresponds to, for example, the number of times of writing that data is written to the initial track, in the band region, adjacent to the shingled write magnetic recording band region SBA2 in the forward direction and the track adjacent to the initial track in the forward direction.

In the example shown in FIG. 15, the MPU 60 increases (or increments) the number of times of reverse direction adjacent track writing STO by one when data is written to the last conventional magnetic recording track CTR1$n$ in the conventional magnetic recording band region CBA1. In other words, the MPU 60 adds one to the number of times of reverse direction adjacent track writing STO when data is written to the last conventional magnetic recording track CTR1$n$ in the conventional magnetic recording band region CBA1.

Note that the MPU 60 may increase (or increment) the number of times of reverse direction adjacent track writing STO by one when data is written to the last conventional magnetic recording track CTR1$n$ and the track CTR1($n-1$) in the conventional magnetic recording band region CBA1. In other words, the MPU 60 may add one to the number of times of reverse direction adjacent track writing STO when data is written to the last conventional magnetic recording track CTR1$n$ and the track CTR1($n-1$) in the conventional magnetic recording band region CBA1.

In the example shown in FIG. 15, the MPU 60 increases (or increments) the number of times of forward direction adjacent track writing STI by one when data is written to the initial track in the band region, in the forward direction, of the shingled write magnetic recording band region SBA2. In other words, the MPU 60 adds one to the number of times of forward direction adjacent track writing STI when data is written to the initial track in the band region, in the forward direction, of the shingled write magnetic recording band region SBA2.

Note that the MPU 60 may increase (or increment) the number of times of forward direction adjacent track writing STI by one when data is written to the initial track in the band region, in the forward direction, of the shingled write magnetic recording band region SBA2 and the track adjacent to this initial track in the forward direction. In other words, the MPU 60 may add one to the number of times of forward direction adjacent track writing STI when data is written to the initial track in the band region, in the forward direction, of the shingled write magnetic recording band region SBA2 and the track adjacent to this initial track in the forward direction.

Figure 16:
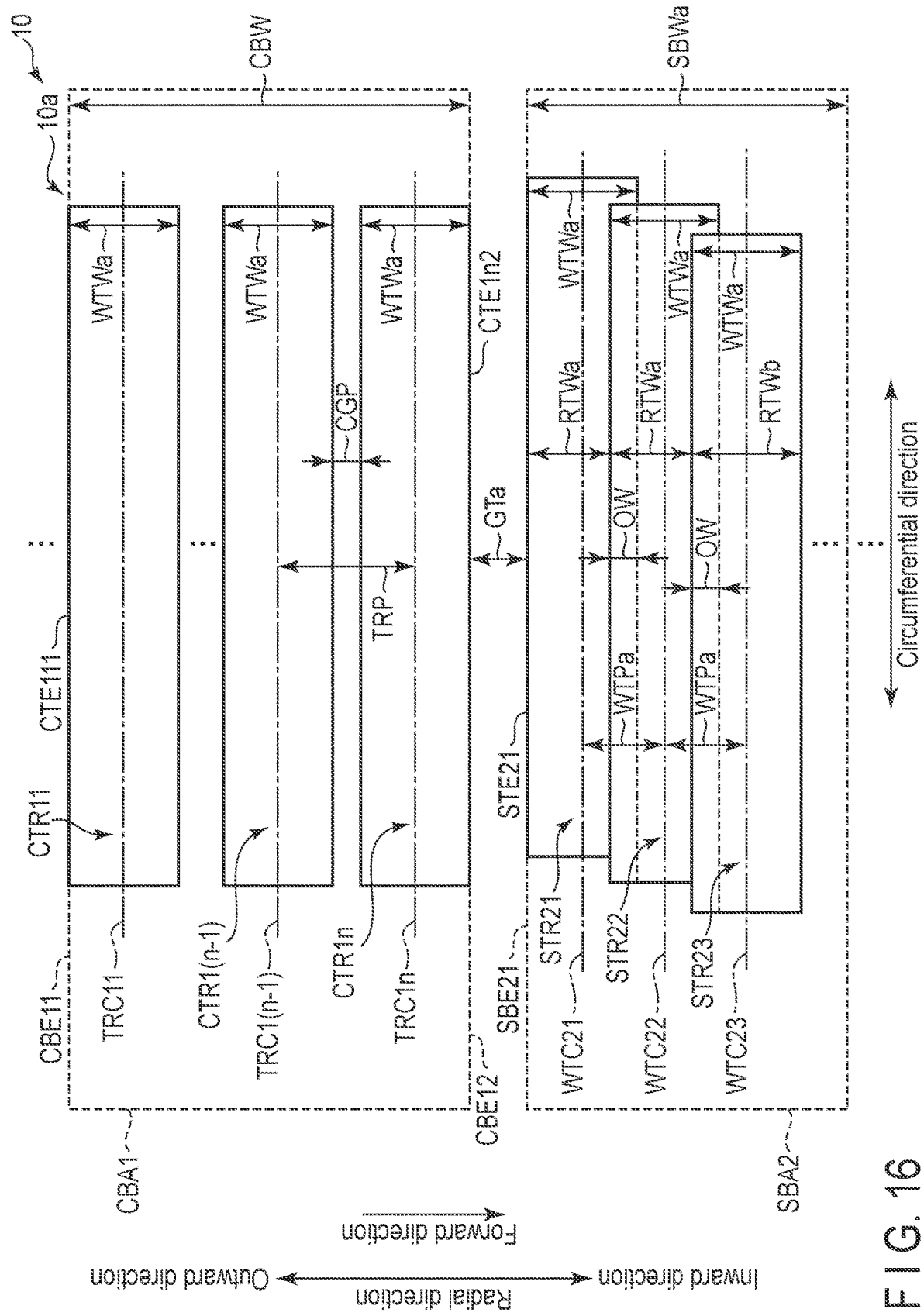
FIG. 16 is a schematic view showing an example of a write process of the conventional magnetic recording band region and the shingled write magnetic recording band region.

FIG. 16 is a schematic diagram showing an example of the write process of the conventional magnetic recording band region CBA1 and the shingled write magnetic recording band region SBA2. FIG. 16 shows the conventional magnetic recording band region CBA1 and the shingled write magnetic recording band region SBA2 that are adjacent to each other in the radial direction. The shingled write magnetic recording band region SBA2 shown in FIG. 16 corresponds to the shingled write magnetic recording band region SBA2 shown in FIG. 6. In the example shown in FIG. 16, the conventional magnetic recording band region CBA1 includes the track CTR11, ..., the track CTR1($n-2$), and the track CTR1$n$. In the conventional magnetic recording band region CBA1, the track CTR11, ..., the track CTR1($n-1$), and the track CTR1n are each written with the track pitch TRP with the gap CGP placed from the adjacent track in the radial direction. Note that the track CTR11, . . . , the track CTR1(n–1), and the track CTR1n may be written with different track pitches in the radial direction. In the example shown in FIG. 16, the track CTR11 corresponds to the initial conventional magnetic recording track, and the track CTR1n corresponds to the last conventional magnetic recording track. In FIG. 16, the end CBE11 of the conventional magnetic recording band region CBA1 in the reverse direction corresponds to the end CTE111 of the initial conventional magnetic recording track CTR11 in the reverse direction. Further, in FIG. 16, the end CBE12 of the conventional magnetic recording band region CBA1 in the forward direction corresponds to the end CTE1n2 of the last conventional magnetic recording track CTR1n in the forward direction. In the example shown in FIG. 16, the conventional magnetic recording band region CBA1 and the shingled write magnetic recording band region SBA2 are disposed with the guard track GTa placed therebetween. That is, in FIG. 16, the last conventional magnetic recording track CTR1n and the initial shingled write magnetic recording track STR21 are disposed with the guard track GTa placed therebetween.

In the example shown in FIG. 16, the MPU 60 conventional-magnetic-records the initial conventional magnetic recording track CTR11, . . . , the track CTR1(n–1), and the last conventional magnetic recording track CTR1n in the conventional magnetic recording band region CBA1. The MPU 60 writes the initial shingled write magnetic recording track STR21 in the shingled write magnetic recording band region SBA2 from the conventional magnetic recording band region CBA1 in the forward direction with the guard track GTa placed therebetween.

In the example shown in FIG. 16, when writing the last conventional magnetic recording track CTR1n in the conventional magnetic recording band region CBA1, the MPU 60 increases the number of times of writing (the number of times of reverse direction adjacent band writing) corresponding to the shingled write magnetic recording band region SBA2 by one. For example, when writing at least one of the tracks CTR1(n–1) and CTR1n in the conventional magnetic recording band region CBA1 disposed within a particular range in the reverse direction from the end SBE21 of the shingled write magnetic recording band region SBA2 in the reverse direction, the MPU 60 may increase the number of times of writing (the number of times of reverse direction proximity track writing) corresponding to the shingled write magnetic recording band region SBA2 by one.

Figure 17:
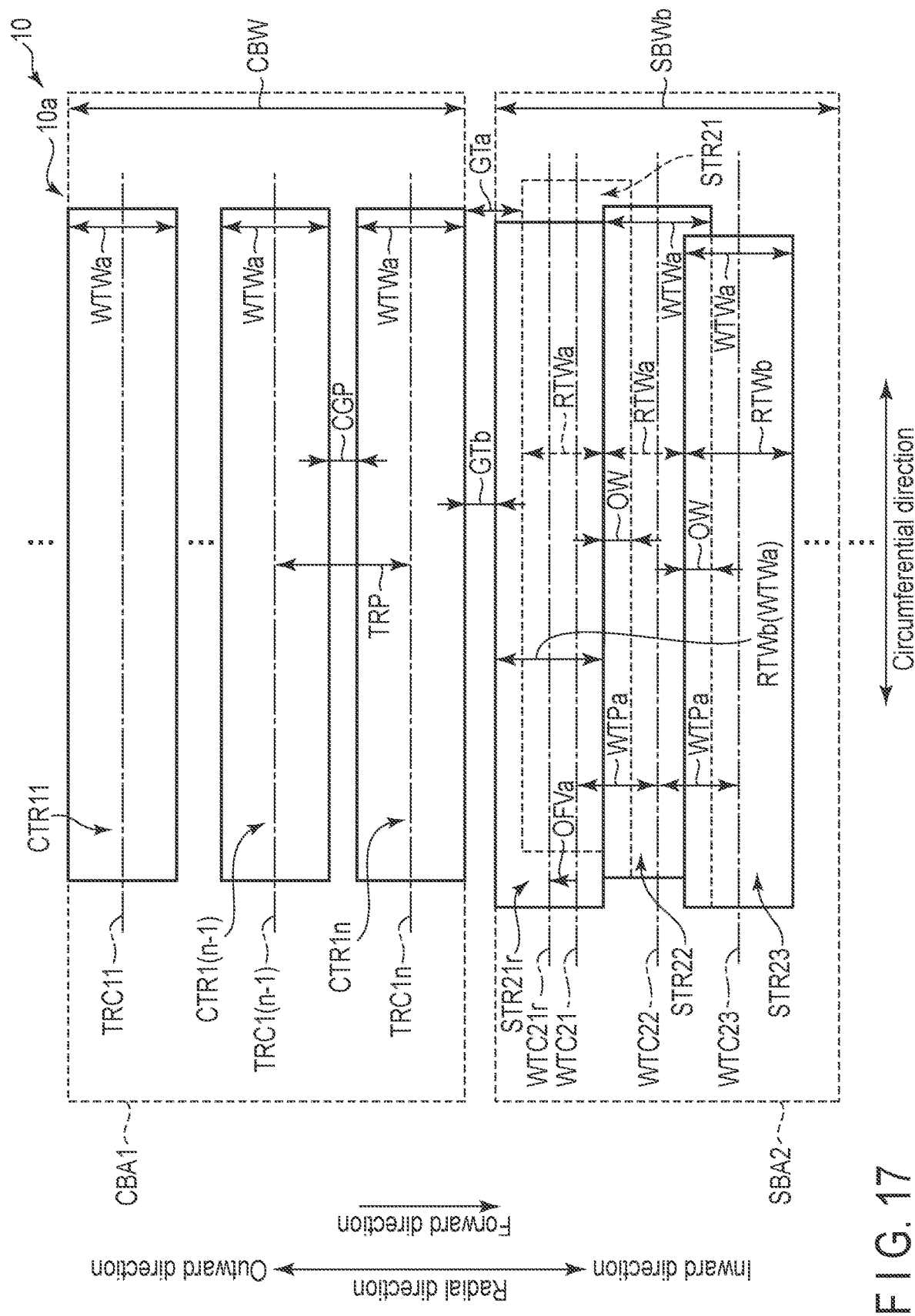
FIG. 17 is a schematic view showing an example of a rewrite process according to a second embodiment.

FIG. 17 is a schematic diagram showing an example of the rewrite process according to the second embodiment. FIG. 17 corresponds to FIGS. 7 and 16.

When it is determined that the number of times of writing (the number of times of reverse direction adjacent track writing) that data is written to the track CTR1n in the conventional magnetic recording band region CBA1 has exceeded the writing count threshold value (adjacent track writing count threshold value) corresponding to the shingled write magnetic recording band region SBA2, the MPU 60 shifts the initial shingled write magnetic recording track STR21 in the shingled write magnetic recording band region SBA2 in the reverse direction by, for example, the shift amount OFVa toward the shingled write magnetic recording band region SBA1 to rewrite the initial shingled write magnetic recording track STR21r by the conventional magnetic recording type.

When it is determined that the number of times of writing (the number of times of reverse direction proximity track writing) that data is written to at least one track of the tracks CTR1(n–1) and CTR1n in the conventional magnetic recording band region CBA1 has exceeded the writing count threshold value (proximity track writing count threshold value) corresponding to the shingled write magnetic recording band region SBA2, the MPU 60 shifts the initial shingled write magnetic recording track STR21 in the shingled write magnetic recording band region SBA2 in the reverse direction by, for example, the shift amount OFVa toward the shingled write magnetic recording band region SBA1 to rewrite the initial shingled write magnetic recording track STR21r by the conventional magnetic recording type.

According to the second embodiment, the magnetic disk device 1 counts the number of times of writing that data is written to the initial track and the last track in the conventional magnetic recording band region adjacent to the target shingled write magnetic recording band region in the radial direction. When it is determined that the number of times of writing that data is written to the initial conventional magnetic recording track in the conventional magnetic recording band region adjacent to the target shingled write magnetic recording band region in the forward direction exceeds the writing count threshold value (adjacent track writing count threshold value) corresponding to this target shingled write magnetic recording band region, the magnetic disk device 1 rewrites the last shingled write magnetic recording track in the target shingled write magnetic recording band region at the same position. When it is determined that the number of times of writing that data is written to the last conventional magnetic recording track in the conventional magnetic recording band region adjacent to the target shingled write magnetic recording band region in the reverse direction exceeds the writing count threshold value (adjacent track writing count threshold value) corresponding to this target shingled write magnetic recording band region, the magnetic disk device 1 offsets the initial conventional magnetic recording track in the target shingled write magnetic recording band region in the reverse direction to perform rewriting. Therefore, the magnetic disk device can improve the write/read process performance.

(Modification 4)

The magnetic disk device 1 according to Modification 4 is different from the magnetic disk device 1 according to the second embodiment described above in the rewrite processing method.

Figure 18:
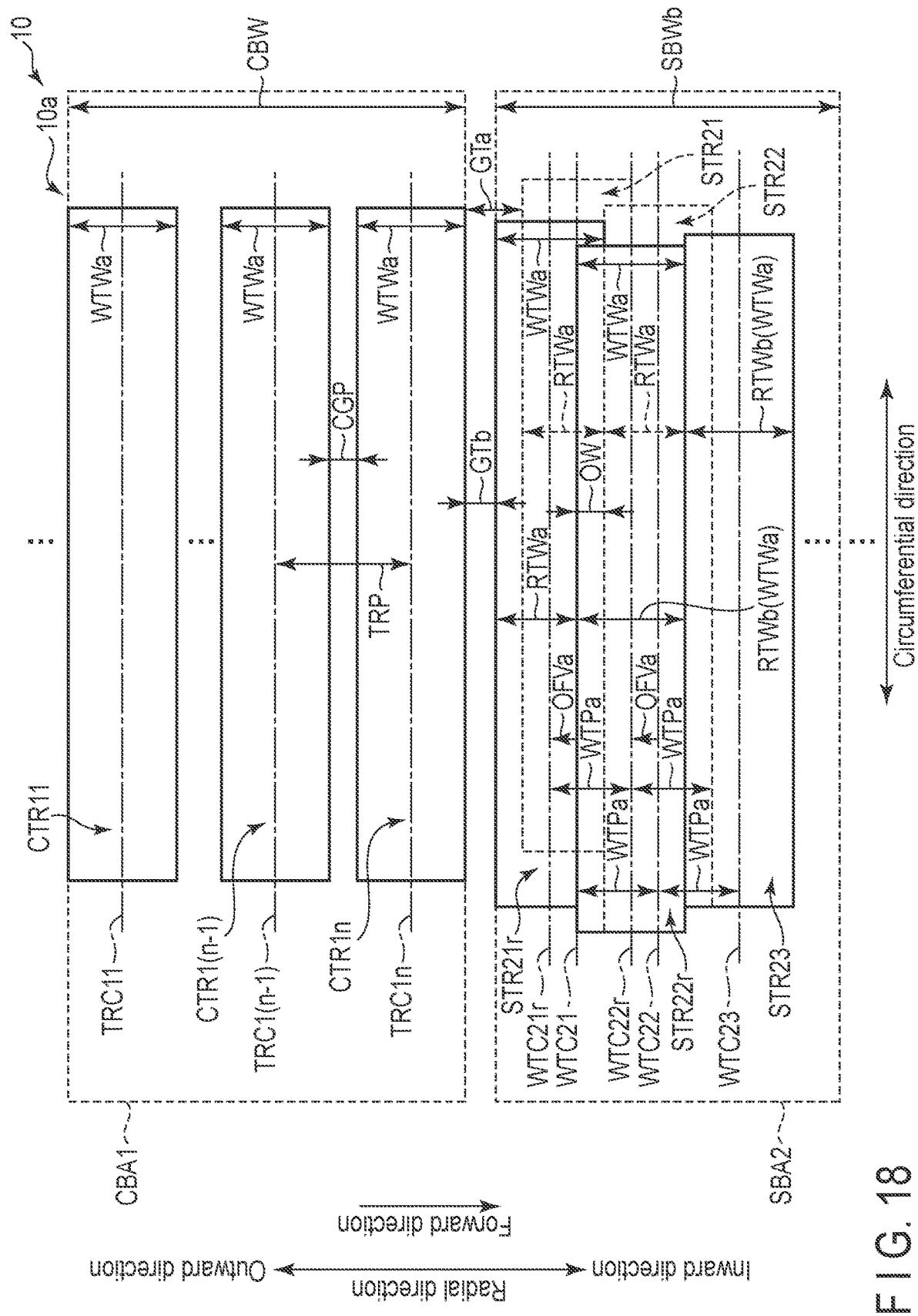
FIG. 18 is a schematic diagram showing an example of a rewrite process according to Modification 4.

FIG. 18 is a schematic diagram showing an example of the rewrite process according to Modification 4. FIG. 18 corresponds to FIGS. 7, 16 and 17.

When it is determined that the number of times of writing (the number of times of reverse direction adjacent track writing) that data is written to the last conventional magnetic recording track CTR1n in the conventional magnetic recording band region CBA1 has exceeded the writing count threshold value (adjacent track writing count threshold value) corresponding to the shingled write magnetic recording band region SBA2, the MPU 60 shifts the initial shingled write magnetic recording tracks STR21 and STR22 of the shingled write magnetic recording band region SBA2 in the reverse direction by, for example, the shift amount OFVa toward the conventional magnetic recording band region CBA1 to rewrite the initial shingled write magnetic recording tracks STR21r and STR22r by the shingled write magnetic recording type.

When it is determined that the number of times of writing (the number of times of reverse direction proximity track writing) that data is written to at least one track of the tracks CTR1(n−1) and CTR1n in the conventional magnetic recording band region CBA1 has exceeded the writing count threshold value (proximity track writing count threshold value) corresponding to the shingled write magnetic recording band region SBA2, the MPU 60 shifts the initial shingled write magnetic recording tracks STR21 and STR22 in the shingled write magnetic recording band region SBA2 in the reverse direction by, for example, the shift amount OFVa toward the conventional magnetic recording band region CBA1 to rewrite the initial shingled write magnetic recording tracks STR21r and STR22r by the shingled write magnetic recording type.

According to Modification 4, the magnetic disk device 1 counts the number of times of writing that data is written to the initial track and the last track in the conventional magnetic recording band region adjacent to the target shingled write magnetic recording band region in the radial direction. When it is determined that the number of times of writing that data is written to the initial conventional magnetic recording track in the conventional magnetic recording band region adjacent to the target shingled write magnetic recording band region in the forward direction exceeds the writing count threshold value (adjacent track writing count threshold value) corresponding to this target shingled write magnetic recording band region, the magnetic disk device 1 rewrites some tracks that are continuously lined up in the reverse direction from the last shingled write magnetic recording track in the target shingled write magnetic recording band region at the same position. When it is determined that the number of times of writing that data is written to the last conventional magnetic recording track in the conventional magnetic recording band region adjacent to the target shingled write magnetic recording band region in the reverse direction exceeds the writing count threshold value (adjacent track writing count threshold value) corresponding to this target shingled write magnetic recording band region, the magnetic disk device 1 offsets some tracks that are continuously shingled-write-magnetic-recorded in the forward direction from the initial conventional magnetic recording track in the target shingled write magnetic recording band region in the reverse direction to perform rewriting. Therefore, the magnetic disk device can improve the write/read process performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when rewriting part or all of data in the second initial track, the controller offsets the second initial track from a first position to a second position away from the first position by a first interval in the second direction to perform rewriting.

2. The magnetic disk device according to claim 1, wherein the controller positions the second initial track at the second position in the second region to perform reading.

3. The magnetic disk device according to claim 1, wherein the first interval is smaller than the gap.

4. The magnetic disk device according to claim 3, wherein the first interval corresponds to a length of an overlapping region in the radial direction where the second initial track in the second region and a first track which is overwritten with the second initial track overlap each other.

5. The magnetic disk device according to claim 1, wherein a plurality of tracks from the first initial track to the first last track is overwritten in the first region.

6. The magnetic disk device according to claim 1, wherein a plurality of tracks from the first initial track to the first last track is each written with an interval in the first region.

7. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when rewriting first data in the second region, the controller offsets a plurality of tracks which is continuously overwritten in the first direction from the second initial track to a first track including the first data by a first interval in the second direction to perform rewriting.

8. The magnetic disk device according to claim 7, wherein the controller offsets a plurality of tracks which is continuously overwritten in the first direction from the second initial track in the second region by the first interval in the second direction to perform reading.

9. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when the number of times of first writing that data is written in the first region exceeds a threshold value corresponding to the second region, the controller offsets the second initial track from a first position to a second position away from the first position by a first interval in the second direction to perform rewriting.

10. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when the number of times of first writing that data is written to a first last track in the first region exceeds a threshold value corresponding to the second region, the controller offsets the second initial track from a first position to a second position away from the first position by a first interval in the second direction to perform rewriting.

11. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when the number of times of first writing that data is written to the first region exceeds a threshold value corresponding to the second region, the controller offsets a plurality of track which is continuously overwritten in the first direction from the second initial track by a first interval in the second direction to perform rewriting.

12. A magnetic disk device comprising:
a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction;
a head that writes data to the disk and that reads data from the disk; and
a controller that offsets part of a plurality of tracks which is overwritten in the second region in a second direction opposite the first direction to perform rewriting;
when the number of times of first writing that data is written to a first last track in the first region exceeds a threshold value corresponding to the second region, the controller offsets a plurality of track which is continuously overwritten in the first direction from the second initial track by a first interval in the second direction to perform rewriting.

13. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising
offsetting part of a plurality of tracks that is overwritten in the second region in a second direction opposite the first direction to perform rewriting; and
when rewriting part or all of data in the second initial track, offsetting the second initial track from a first position to a second position away from the first position by a first interval in the second direction to perform rewriting.

14. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising
offsetting part of a plurality of tracks that is overwritten in the second region in a second direction opposite the first direction to perform rewriting; and
when rewriting first data in the second region, offsetting a plurality of tracks which is continuously overwritten in the first direction from the second initial track to a first track including the first data by a first interval in the second direction to perform rewriting.

15. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising offsetting part of a plurality of tracks that is overwritten in the second region in a second direction opposite the first direction to perform rewriting; and when the number of times of first writing that data is written in the first region exceeds a threshold value corresponding to the second region, offsetting the second initial track from a first position to a second position away from the first position by a first interval in the second direction to perform rewriting.

16. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising offsetting part of a plurality of tracks that is overwritten in the second region in a second direction opposite the first direction to perform rewriting; and when the number of times of first writing that data is written to a first last track in the first region exceeds a threshold value corresponding to the second region, offsetting the second initial track from a first position to a second position away from the first position by a first interval in the second direction to perform rewriting.

17. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising offsetting part of a plurality of tracks that is overwritten in the second region in a second direction opposite the first direction to perform rewriting; and when the number of times of first writing that data is written to the first region exceeds a threshold value corresponding to the second region, offsetting a plurality of track which is continuously overwritten in the first direction from the second initial track by a first interval in the second direction to perform rewriting.

18. A rewrite processing method applied to a magnetic disk device including a disk having a first region in which a plurality of tracks is written from a first initial track located at a first end in a radial direction to a first last track located at a first other end opposite the first end in the radial direction and a second region that is positioned with a gap in a first direction of the radial direction of the first region, and in which a plurality of tracks is overwritten in the first direction from a second initial track located at a second end in the radial direction to a second last track located at a second other end opposite the second end in the radial direction, the method comprising offsetting part of a plurality of tracks that is overwritten in the second region in a second direction opposite the first direction to perform rewriting; and when the number of times of first writing that data is written to a first last track in the first region exceeds a threshold value corresponding to the second region, offsetting a plurality of track which is continuously overwritten in the first direction from the second initial track by a first interval in the second direction to perform rewriting.

\* \* \* \* \*